United States Patent
Wang et al.

(10) Patent No.: US 7,213,309 B2
(45) Date of Patent: May 8, 2007

(54) TREATED TEXTILE SUBSTRATE AND METHOD FOR MAKING A TEXTILE SUBSTRATE

(76) Inventors: Yunzhang Wang, 526 Forest Shoals La., Duncan, SC (US) 29334; Daniel T. McBride, 3412 Fairfield Rd., Chesnee, SC (US) 29323; Randolph S. Kohlman, 1402 Springfield Rd., Boiling Springs, SC (US) 29316

( * ) Notice: Subject to any disclaimer, the term of this patent is extended or adjusted under 35 U.S.C. 154(b) by 486 days.

(21) Appl. No.: 10/785,218

(22) Filed: Feb. 24, 2004

(65) Prior Publication Data

US 2005/0186872 A1     Aug. 25, 2005

(51) Int. Cl.
*D06C 11/00*     (2006.01)

(52) U.S. Cl. .......................... 26/28; 28/163

(58) Field of Classification Search .............. 26/28, 26/27, 29 R, 30, 33–37, 69 C; 28/162, 163, 28/165, 170; 428/400, 174, 409; 451/28, 451/53, 57, 54

See application file for complete search history.

(56) References Cited

U.S. PATENT DOCUMENTS

| | | | |
|---|---|---|---|
| 4,316,928 A | 2/1982 | Otto | 428/229 |
| 4,468,844 A | 9/1984 | Otto | 26/28 |
| 4,512,065 A | 4/1985 | Otto | 26/28 |
| 5,437,900 A | 8/1995 | Kuzowski | 428/36.1 |
| 5,815,896 A | 10/1998 | Dischler | 26/28 |
| 5,943,745 A * | 8/1999 | Dischler | 26/28 |
| 5,968,642 A | 10/1999 | Saito | 428/304.4 |
| 6,068,911 A | 5/2000 | Shouji et al. | 428/143 |
| 6,112,381 A | 9/2000 | Dischler et al. | 26/28 |
| 6,122,807 A * | 9/2000 | Beltramini | 26/28 |
| 6,233,795 B1 * | 5/2001 | Dischler | 26/28 |
| 6,379,753 B1 | 4/2002 | Soane et al. | 427/434.2 |
| 6,380,336 B1 | 4/2002 | Soane et al. | 526/245 |
| 6,472,476 B1 | 10/2002 | Soane et al. | 525/200 |
| 6,649,266 B1 | 11/2003 | Gross et al. | 428/410 |
| 2002/0016433 A1 | 2/2002 | Keller et al. | 528/10 |
| 2002/0142150 A1 | 10/2002 | Bauamm et al. | 428/328 |

(Continued)

FOREIGN PATENT DOCUMENTS

| | | |
|---|---|---|
| WO | 00/14297 | 3/2000 |

(Continued)

OTHER PUBLICATIONS

Sm*******an Surfaces; materials today; Nov. 2003.

*Primary Examiner*—A. Vanatta
(74) *Attorney, Agent, or Firm*—Terry T. Moyer; Brenda D. Wentz

(57) ABSTRACT

Compositions and methods for treating textile substrates to obtain superior liquid repellent properties are disclosed. Durable microscopic surface structures imparted to the fibrous substrate allow liquids to bead up and roll off of its surface. Mechanical abrasion or sanding techniques may be used to create the microscopic surface structures on the surface of a fibrous textile substrate, without substantially breaking fibers, followed by a chemical treatment using, for example, fluorocarbon-containing repellent compositions. Particles may be employed in combination with repellent compositions to achieve superior repellent properties. A property of the roughened surface fibers, the Roughness Factor, is used to characterize the microscopic surface structures on the treated textile surface. Treated textile substrates are disclosed which achieve superior water and oil repellency, even after multiple abrasion or laundering cycles.

2 Claims, 9 Drawing Sheets

U.S. PATENT DOCUMENTS

| | | | |
|---|---|---|---|
| 2002/0150723 A1 | 10/2002 | Oles et al. | 428/143 |
| 2002/0150724 A1 | 10/2002 | Nun et al. | 428/143 |
| 2002/0150725 A1 | 10/2002 | Nun et al. | 428/143 |
| 2002/0150726 A1 | 10/2002 | Nun et al. | 428/143 |
| 2002/0170690 A1 | 11/2002 | Buchsel et al. | 162/109 |
| 2003/0013795 A1 | 1/2003 | Nun et al. | 524/442 |
| 2003/0096083 A1 | 5/2003 | Morgan et al. | 428/141 |
| 2003/0147932 A1 | 8/2003 | Nun et al. | 424/405 |

FOREIGN PATENT DOCUMENTS

| | | |
|---|---|---|
| WO | 00/14323 | 3/2000 |
| WO | 02/084013 | 10/2002 |
| WO | 02/084016 | 10/2002 |

* cited by examiner $$\gamma_{LV} \cdot \cos\theta = \gamma_{SV} - \gamma_{SL}$$
$\gamma$: FREE ENERGY PER UNIT AREA OR SURFACE TENSION
L: LIQUID
S: SOLID
V: VAPOR
SL: SOLID/LIQUID INTERFACE
$\theta$: CONTACT ANGLE
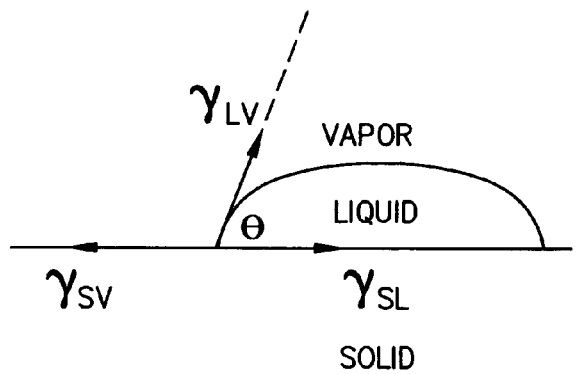
*Figure -1-*
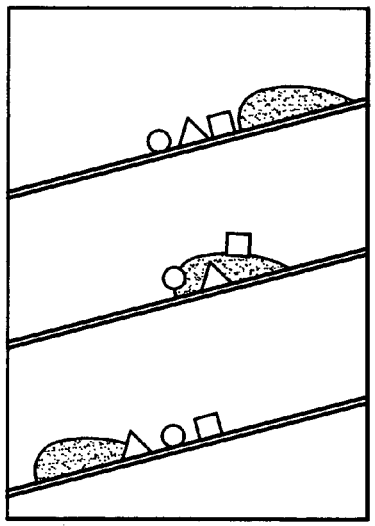 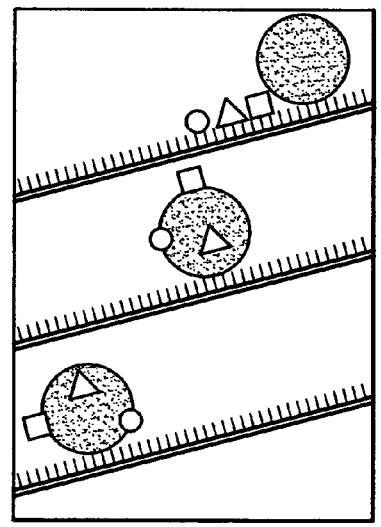
SMOOTH SURFACE      ROUGH SURFACE
*Figure -2-*

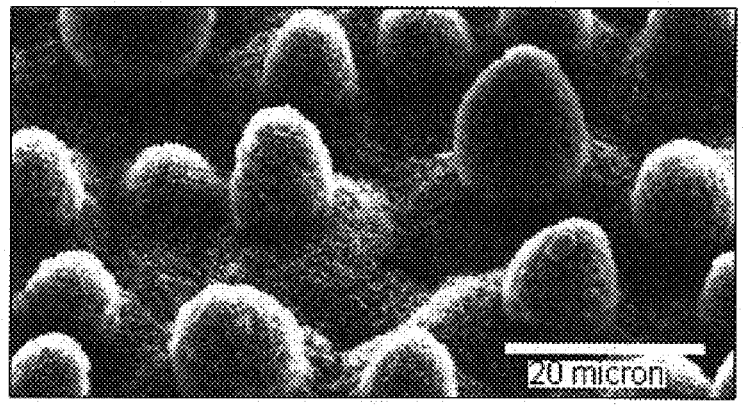
LOTUS LEAF STRUCTURE
*Figure −3−*
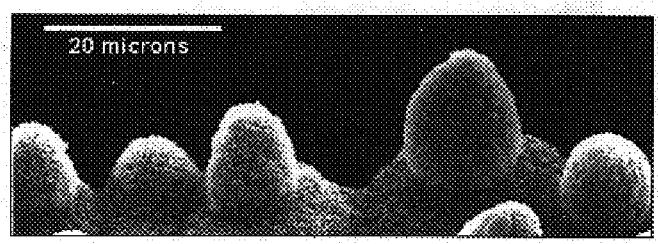
LOTUS STRUCTURE
*Figure −3A−*
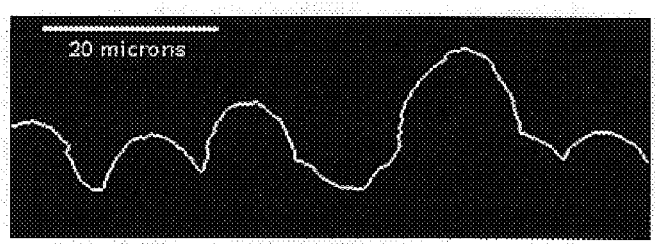
LOTUS PROFILE
*Figure −3B−*

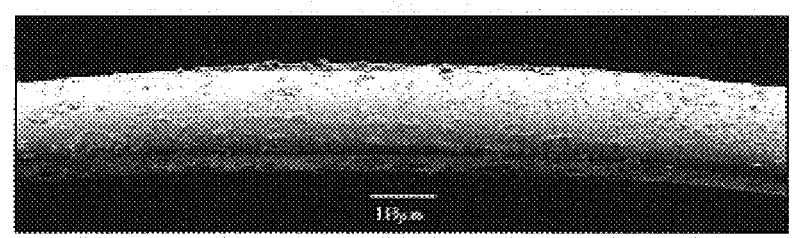
PRIOR ART
Figure −4−
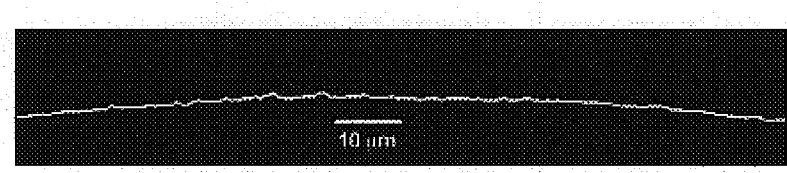
PRIOR ART PROFILE
Figure −4A−

*Figure −5−*
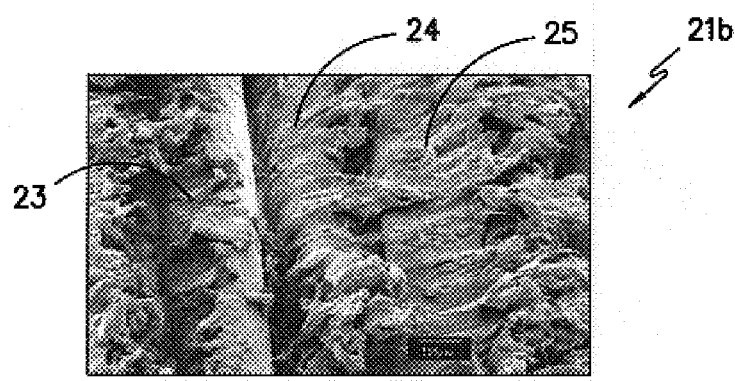
*Figure −5A−*
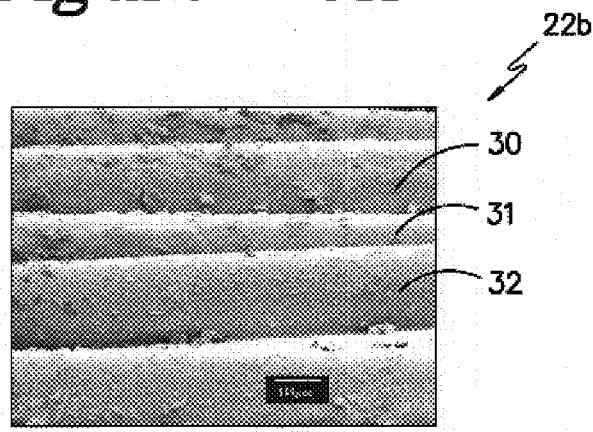
*Figure −5B−*

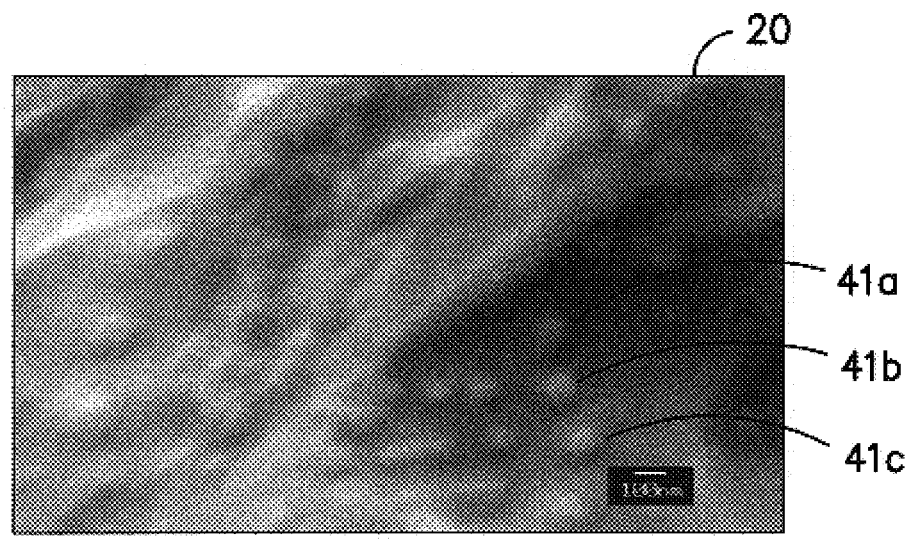
*Figure -5C-*
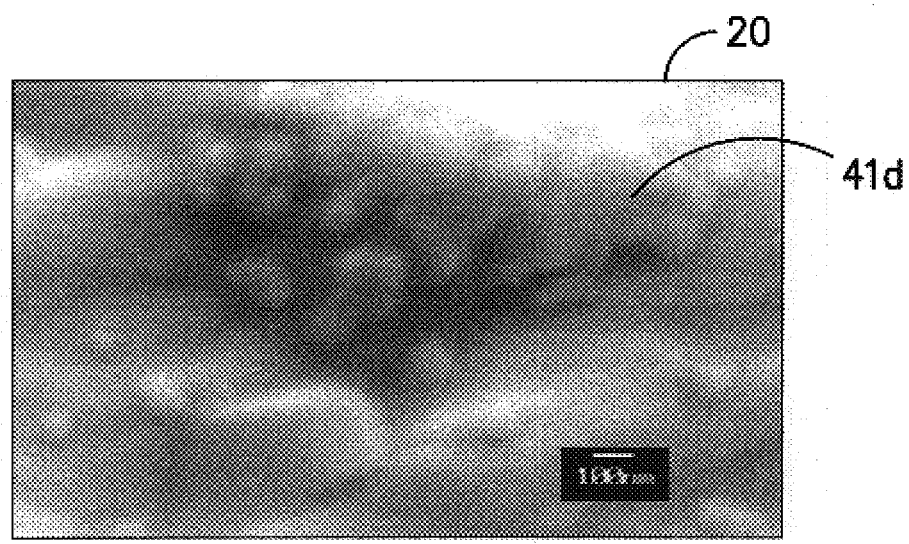
*Figure -5D-*

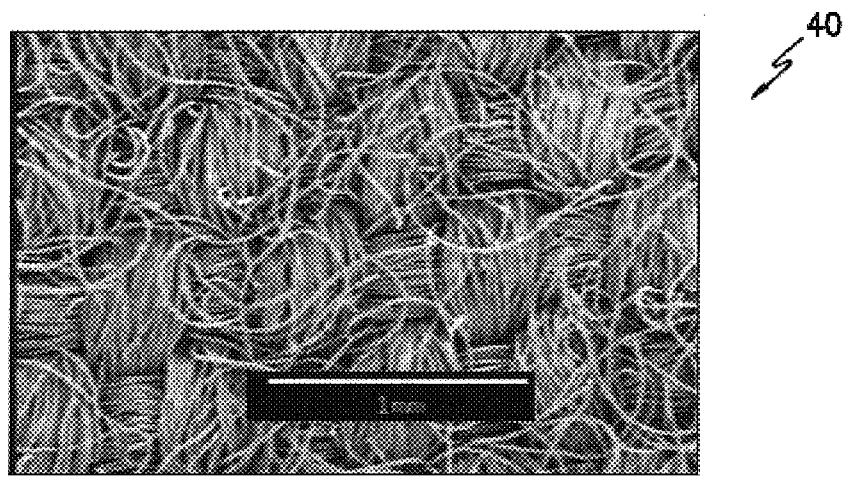
*Figure -6-*
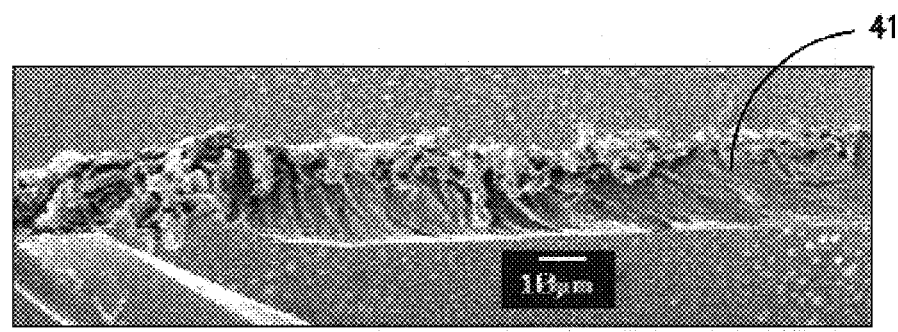
*Figure -7A-*
*Figure -7B-*

*Figure —7C—*
*Figure —7D—*
*Figure —7E—*

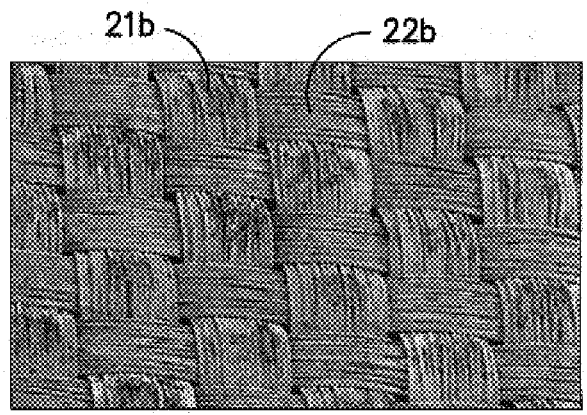
FIG. -9A-
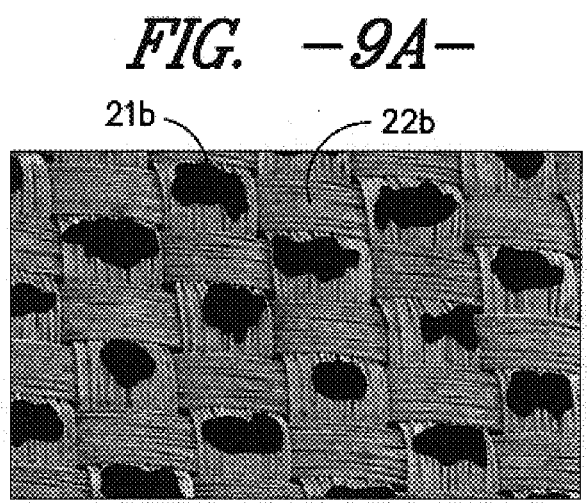
FIG. -9B-
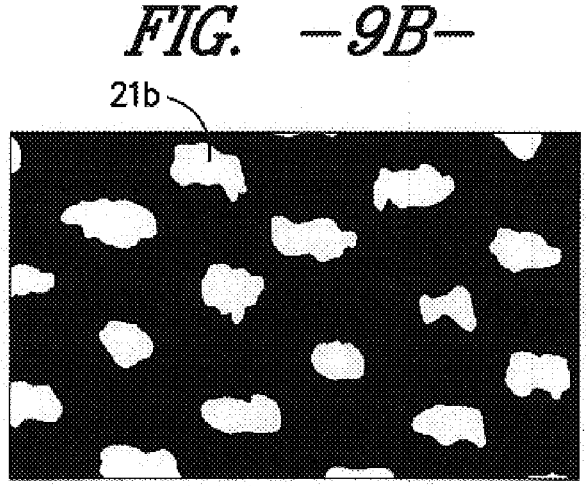
FIG. -9C-

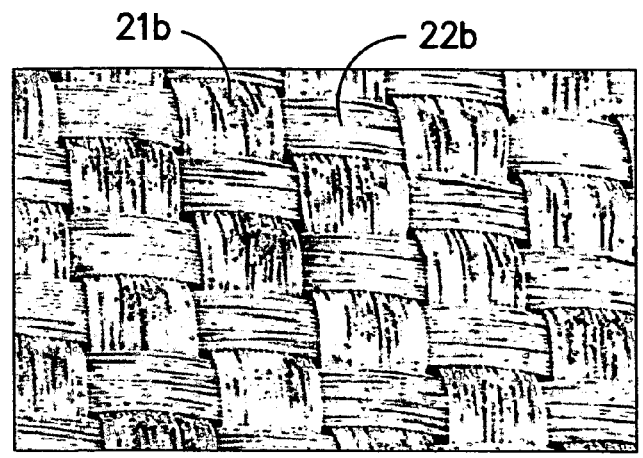
FIG. -9A-
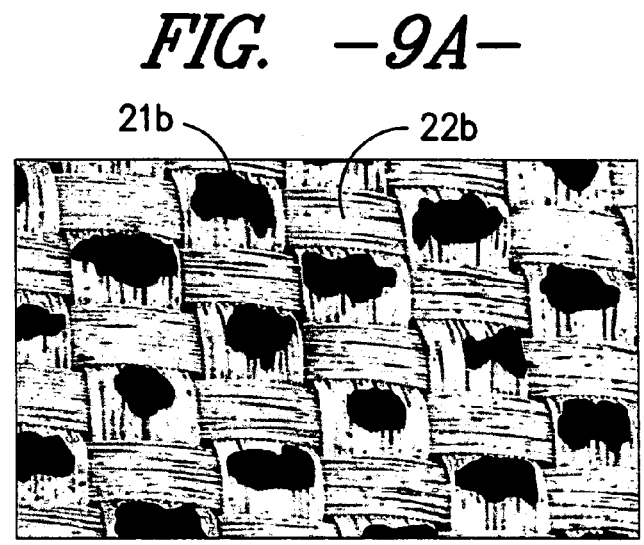
FIG. -9B-
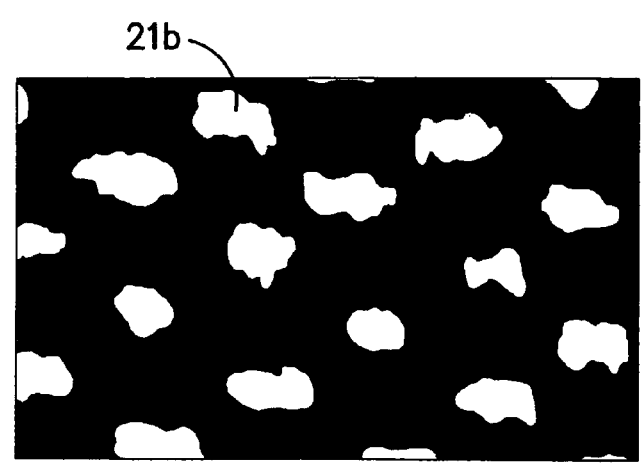
FIG. -9C-

TREATED TEXTILE SUBSTRATE AND METHOD FOR MAKING A TEXTILE SUBSTRATE

BACKGROUND OF THE INVENTION

There has been great interest recently in the surface chemistry and textile field about so-called super-hydrophobic surfaces and their resulting "self-cleaning" properties. This self-cleaning effect of the super-hydrophobic surface is principally controlled by how a liquid (typically water) interacts with the surface of, for instance, a textile substrate. The interaction between a liquid, air and a flat solid surface is governed by Young's equation and is often described by a contact angle between a liquid droplet and a solid surface. The contact angle is determined by the interfacial tensions between the solid-liquid, solid-air, and liquid-air interfaces. The solid surface may be, for example, hydrophilic (having a strong affinity for or the ability to absorb water) or hydrophobic (lacking affinity for or the ability to absorb water). Typically, a surface having a high contact angle is more hydrophobic that a surface having a lower contact angle. Young's equation and a schematic illustration of the solid/liquid interface contact angle are shown in FIG. 1.

Young's equation is useful to determine the contact angle of a droplet (such as water) on a uniform flat surface. So far, the highest water contact angle on a flat solid surface is around 120 degrees for low surface energy fluorinated materials. To further improve the contact angle, surface structure modifications are needed. It is known that the contact angle can be substantially higher on a rough surface than on a flat surface with the same chemical nature. For highly roughened hydrophobic surfaces with relatively high aspect ratios, which allows a substantial amount of air to be trapped underneath a water droplet, the contact angle can be greater than 150 degrees (i.e., a super-hydrophobic surface). In both cases having roughened surfaces, Young's equation is modified, since the surface area in contact with the water droplet has changed. When a drop of water is put on such a super-hydrophobic surface, the water droplet beads up like a sphere and may roll off when the surface is tilted slightly. It is noted, however, to achieve a low roll off angle, which is defined as the minimum tilt angle at which a drop starts to roll, high contact angle alone is not sufficient. It also requires low contact angle hysteresis, which is defined as the difference between the advancing angle and receding angle. The advancing angle is the contact angle of a liquid that is observed while increasing the volume of a drop that is pinned to a surface by, for instance, a syringe. Decreasing the volume of the very same drop of liquid results in the receding angle. If a liquid drop has a high advancing contact angle, but has a substantially lower receding contact angle (i.e. with a substantial contact angle hysteresis), the drop may bead up but a higher roll off angle is required for the drop to roll. It may furthermore leave a trail of liquid behind it on the surface. On the other hand, if a liquid drop has both high advancing and receding contact angles without substantial hysteresis, the drop is able to bead up and roll off at a small tilt angle without leaving a significant trail of liquid behind it on the surface (i.e., a super liquid repellent surface). This beading and rolling action allows the liquid drop to roll off the surface and carry away loose dirt or dust with the drop, which leads to the "self-cleaning" property. On a smooth surface with lower contact angles, on the other hand, the liquid drop does not pick up the surface dirt. It typically will only redistribute the dirt. These scenarios are schematically illustrated in FIG. 2.

The super water repellent self-cleaning approach is found in nature in a water loving plant called the Lotus. The Lotus plant is a wetland species native to Asia, and it is revered as a symbol of purity because it maintains its cleanliness, although it grows out of muddy water. The Lotus plant's super water repellent self-cleaning properties come from a combination of rough physical surface structures and hydrophobic surface chemistries. Specifically, the surface of the Lotus leaf exhibits two levels of surface irregularity, as shown in FIG. 3. Each leaf surface (see also FIGS. 3A and 3B) is covered in an array of tiny bumps, about 5–10 μm high, and about 10–15 μm apart. A scale showing 20 microns is evident in all three of these Figures, enabling an estimation of the approximate size of the surface features. This set of uneven surface structures is also covered with much smaller waxy, hydrophobic crystals, measuring about 1 nm or less in diameter. It is believed that this "dual" level of structure on the Lotus leaf surface increases the overall surface roughness, which correspondingly boosts its effective hydrophobicity. The two-tier structure, with hydrophobic "valleys," reduces the likelihood of surface air spaces being invaded by water, for instance, from condensation, evaporation, or high impact rainstorms, since it is not energetically favorable for the water to fill the valley. Thus, it is believed that the physical surface structure of the Lotus leaf, coupled with its surface chemistry (hydrophobic wax crystals), allows the surface to act as a super water repellent, self-cleaning surface where water beads up and rolls off, carrying away loose dirt from the surface. This super water repellent self-cleaning action in the presence of water on surfaces is often known as the "Lotus-Effect".

In analogy to the Lotus plant, textile surfaces that repel fluids and demonstrate super liquid repellency and associated self-cleaning properties would be able to maintain their appearances more effectively. Thus, a textile surface having properties similar to the Lotus plant may be highly desirable. A textile substrate having Lotus properties might be used to make highly water repellent and/or fluid stain repellent fabrics for applications, such as, for example, raingear, boat covers, awnings, lawn furniture, apparel, etc. In providing fabrics that are water and/or fluid stain repellent, the fabrics may also be resistant to bacterial and mold growth, since water and/or other liquids would not tend to collect or wick into such surfaces to provide a breeding ground for the bacteria and mold.

Repellent textile substrates have been available in the market for some time. For example, fluorocarbon treatments are known to provide a repellent finish to such substrates. Many fluorocarbon-containing compositions are known to provide repellency to both water and oil when applied to a textile substrate. However, to obtain the high contact angles and low roll off angles required for a super water repellent surface, a surface structure similar to that of the Lotus leaf is typically required. There have been a variety of efforts by others to produce such Lotus-like surface structures, such as in U.S. Pat. No. 6,068,911 to Shouji et al.; U.S. Patent Application Publication No. 2002/0016433 to Keller et al.; and U.S. Patent Application Publication Nos. 2002/0150723, 2002/0150724, 2002/0150725, 2002/0150726, 2003/0013795, and 2003/0147932 to Creavis Gesellschaft Fuer Techn. Und Innovation MBH. These references disclose means to use particles to build rough structures on primarily smooth flat surfaces. Textile substrates treated according to these references generally do not provide durable repellency because they often lose most or all of their repellency when laundered or when abraded during normal use. Thus, textile substrates that retain advantageous superior liquid repellent properties, after laundering or exposure to abrasion from normal use, would be very desirable and novel.

U.S. Pat. No. 5,968,642 to Saito is directed to an article having a water-repellent fluororesin surface. The article has a water-repellent fluororesin surface composed of an irregularly porous material which is formed by irregularly stacking fluororesin particles, with an average diameter of no more than 40 microns, over one another. Again, this patent is directed to substrates that have a flat surface, such as an aluminum sheet. Furthermore, it fails to demonstrate its applicability to complex structured textile substrates having irregular surfaces, and it fails to demonstrate durability of the treatment against laundering and abrasion for textile applications.

U.S. Pat. No. 6,649,266 to Gross et al. is directed to substrates such as glass or metal with a microstructured surface for easy-to-clean systems and methods to produce such substrates. The treatment is comprised of a composition that includes condensates of one or more hydrolysable compounds. At least some of these compounds contain both hydrolysable and non-hydrolysable groups with a ratio from 10:1 to 1:2. Inorganic nanoparticles are used to produce the microstructured surface before the coating composition is applied to the substrate. The microstructured surface may also be obtained by embossing the coating composition, before or during drying and/or curing, with an embossing die. The contact angle, with respect to water or hexadecane on such microstructured substrates, is at least 5 degrees higher than the contact angle of a corresponding smooth surface. While the methods taught in this patent may work well on flat surfaces, the teachings therein fail to demonstrate its applicability to complex-structured textile substrates and further, fail to demonstrate durability of the treatment against laundering and abrasion for typical textile applications.

U.S. Patent Application No. 2003/0096083 to Morgan et al. relates to surfaces of objects, in particular containers for receiving liquid, comprising a surface which is extremely hydrophobic and to a method for producing such surface. According to the reference, a surface structure is created by fine blasting the surface with suitable blasting material and/or embossing with an appropriate embossing step or etching by means of a suitable etching material. This reference fails to teach how to treat complex structured textile substrates and fails to demonstrate durability of the treatment against laundering and abrasion for typical textile applications.

One publication, WO 01/75216, discloses a method for applying a finishing layer to a textile carrier material. According to the publication, a water repellent layer or an oil repellent layer is applied to a carrier material of a group of fibers, tissues and fabrics. The water or oil repellent finishing layer comprises at least two water or oil repellent components. A first component comprises at least one dispersing agent and a second component comprises at least one dispersed phase or a colloid. The dispersing agent and the dispersed phase are present in a gel state. The colloids of the dispersed phase are distributed in the dispersing agent in an anisotropic manner in such a way that the colloids are present in concentrated form in the region of the finishing surface, which forms a phase boundary layer between the finishing layer and the surrounding atmosphere. An essential feature of this approach is the use of a dispersion system as a "guest-host" system which allows spatial self organization of the finishing components. The "guest" component becomes phase separated from the "host" component and concentrated on top of the finishing layer with a columnar structured micro rough surface. This approach relies on the chemical mixtures to be inherently phase instable. Thus, the process is difficult to control and may cause problems during large-scale manufacturing.

Another publication, WO 02/084016, is directed to a flat textile structure with self-cleaning and water-repellent surfaces that are composed of (a) at least one synthetic and/or natural textile base material A and (b) one artificial and, at least partially, hydrophobic surface with elevations and depressions from particles that are firmly linked with the base material A without glues, resins or lacquers. The flat textile structures are obtained by treating the base material A with at least one solvent that contains the particles in an undissolved state and then removing the solvent so that at least a part of the particles are firmly linked with the surface of the base material A. However, this publication fails to demonstrate low dynamic rolling angles and durability of the treatment against laundering and abrasion.

Yet another publication, WO 02/084013, is directed to a polymer fiber which has a self-cleaning and water-repellent surface and which is comprised of: (a) at least one synthetic fiber material A and (b) a synthetic and, at least partially, hydrophobic surface with elevations and depressions made of particles that are joined to the fiber material A in a fixed manner without the use of adhesives, resins or varnishes. The polymer fiber is obtained by treating the fiber material A with at least one solvent that contains the particles in undissolved form and then removing the solvent so that at least a portion of the particles are joined to the surface of the synthetic fiber material A in a fixed manner. Again, this publication fails to demonstrate low dynamic rolling angles and durability of the treatment against laundering and abrasion.

The prior art systems that use hydrophobic particles and binders in solvent systems on film, metallic, or ceramic surfaces to achieve super-hydrophobic self-cleaning properties have significant drawbacks, such as poor durability, when applied to textile substrates. The coatings applied to the surfaces wear off easily during normal use. FIGS. 4 and 4A show a fiber from a woven textile substrate that have been treated with hydrophobic particles according to procedures described in U.S. Patent Application No. 2002/0016433 A1 to Keller et al. These textile substrates may achieve some level of repellency, but the repellency is not durable against laundering of the fibers or the textile substrate. The hydrophobic particles are easily and undesirably removed from the surface.

In summary, most prior art systems that attempt to achieve the Lotus-Effect, as described herein, are directed to substrates that have a flat smooth surface, such as glass, ceramic, metal sheet, plastic film, etc. On such smooth surfaces, the rough structures required for super-hydrophobic self-cleaning properties may be achieved by using particles alone. On a typical textile substrate, such as a woven fabric, a complex surface topology already exists. For instance, millimeter scale structures are created by the weaving of yarns; 10 to 100 micrometer scale structures are created by fibers within the yarn. Furthermore, the textile substrates are mechanically flexible. On such complex structured flexible textile substrates, particles alone typically are not sufficient to build desired rough structures which exhibit the Lotus-Effect and that are durable against laundering and abrasion for textile applications.

Surface structures can be imparted to a textile substrate by other ways. For instance, mechanical means of treating surfaces of textiles are known. Desirable hand (or feel) or other properties may be provided to fabrics using treatments that involve techniques of abrasion, sanding, or napping the fabric. However, the usual goal of mechanically treating textile surfaces is to break fibers and produce broken-fiber "hairs" that make a surface feel softer. Therefore, the purpose of such conventional mechanical treatment is typically to modify the hand of a substrate rather than to roughen the surfaces of fibers without breaking the fibers. For example, U.S. Pat. Nos. 6,112,381; 5,815,896; 4,512,065; 4,316,928; and 4,468,844 describe various types of mechanical treatments for the surfaces of textile substrates. However, textile substrates that are mechanically treated by these types of processes are found to lack the desired roughness structures that are needed for the lotus-effect properties.

Thus, the need exists for a composition and/or a method of treating or coating textile substrates that results in a textile substrate having a super liquid repellent self-cleaning surface. A surface structure and method for treating a textile substrate that will afford surface properties exhibiting a high degree of repellency, as measured by low dynamic rolling angle (DRA), is very desirable. A surface structure and method for treating a textile substrate that will afford surface properties exhibiting a high degree of repellency, that is durable after multiple launderings and/or abrasions, is also desirable.

Surprisingly, we found that, on such complex structured textile substrates, superior liquid (e.g. water and oil) repellent properties can be obtained by mechanically roughening only a portion, for example 10% or more, of the fibrous textile substrate surface without substantially breaking fibers. Durability of the repellent properties may be enhanced by following mechanical treatment of the substrate with a chemical treatment using, for example, fluorocarbon-containing repellent compositions. Particles may be used in combination with the repellent chemical treatment. The mechanical roughening treatment of the present invention occurs in a treatment regime very different from that used in the prior art. The resulting treated textile substrates are believed to be durable against multiple cycles of laundering and/or abrasion experienced during normal use because the mechanically roughened structures on the surfaces of the fibers are part of the fibers themselves and are attached durably and directly to the fibers.

BRIEF DESCRIPTION OF THE DRAWINGS

FIG. 1 is a sketch showing contact angle phenomena and wetting.

FIG. 2 is a drawing showing a comparison of droplet behavior upon a smooth surface when compared to a rough surface.

FIG. 3 shows a photomicrograph of the super-hydrophobic "rough" structure of a Lotus leaf, having a microstructure and a much smaller nanostructure.

FIG. 3A shows a magnified photomicrographic view of the two-tiered structure of the Lotus leaf shown in FIG. 3.

FIG. 3B shows a side profile of the surface irregularity of the Lotus leaf shown in FIG. 3A.

FIG. 4 is a magnified photomicrograph view (at 1000× magnification) of a prior art fiber having particles present on the surface of the fiber to form nanostructures, but which further exhibits relatively poor durability.

FIG. 4A is a profile corresponding to the prior art fiber of FIG. 4.

FIG. 5 is a magnified photomicrograph view of a plain weave polyester fabric described in Example 10 showing first regions of relatively high levels of roughness and second regions of relatively low levels of roughness.

FIG. 5A is a magnified photomicrograph view (at 500× magnification) of FIG. 5 showing a first region with surface fibers that have relatively high levels of roughness.

FIG. 5B is a magnified photomicrograph view (at 500× magnification) of FIG. 5 showing a second region with surface fibers that have relatively low levels of roughness.

FIG. 5C is a magnified photomicrograph view (at 50000 magnification) of FIG. 5 illustrating the individual nanoparticles present on the surface of a fiber having a relatively high level of roughness.

FIG. 5D is a magnified photomicrograph view (at 50000× magnification) of FIG. 5 illustrating an agglomeration of nanoparticles present on the surface of a fiber having a relatively high level of roughness.

FIG. 6 is a magnified photomicrograph view of a plain weave polyester fabric mechanically treated by conventional coarse grit abrasive rolls which illustrates the large number of broken fibers present on the surface of the fabric.

FIGS. 7A–7C are magnified photomicrograph views of tent fabric fibers, further described in Example 6, having highly roughened edges which may be measured to determine the Roughness Factor of those fibers.

FIG. 7D shows a calculated silhouette or shadow as estimated for measuring the Roughness Factor (R.F.) for the fiber shown in FIG. 7C.

FIG. 7E shows an edge profile image for the fiber shown in FIG. 7C.

FIG. 8A is a magnified photomicrograph view (at 1000× magnification) of a fiber of the tent fabric, as described in Example 20, taken from an area of relatively high roughness and which is determined to have a correspondingly high Roughness Factor.

FIG. 8B shows an edge profile of the roughened fiber of FIG. 8A, which can be used to estimate the Roughness Factor of the fiber.

FIG. 9A is a magnified photomicrograph view (at 50×) of a plain weave polyester fabric, as described in Example 10, showing first regions of relatively high levels of roughness (mechanically roughened portions) and second regions of relatively low levels of roughness.

FIG. 9B shows the same image as FIG. 9A except that the highly roughened regions of the textile substrate surface are set to black (pixel value of 0).

FIG. 9C shows the same image as FIG. 9B except the pixels representing the highly roughened regions of the textile substrate surface are set to 255 (i.e., white) and the pixel values for everything else are set to 0 (i.e. black) so that the image has been converted into a binary image where there are only white pixels and black pixels.

DETAILED DESCRIPTION OF THE INVENTION

Reference now will be made to various embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. All patents, published patent applications, and any other publications mentioned in this patent application are herein incorporated by reference.

As mentioned previously, to obtain a surface that is super liquid-repellent, desired surface roughness, preferably with relatively high aspect ratios, should be built upon that surface. Air trapped in the valleys of the rough surface causes drops of liquid to bead up and roll off of that surface. One element of the present invention is the method of creating the roughened surfaces on a textile substrate that mimic the Lotus leaf. This invention provides compositions and methods of treating textiles that afford superior liquid (e.g. water, oil, etc.) repellency and potentially easy-clean properties to the textile substrate that are durable to laundering and abrasion.

Roughness is generally determined to include any protrusion, nick, gouge, scuff, indentation, crater or other surface structure present on the fibrous textile substrate surface, as a result of mechanical treatment, chemical treatment, or combinations thereof, that modifies the surface from being characterized as relatively smooth and regular to a surface that may be characterized as less smooth and regular. Accordingly, the descriptive term "roughness" generally refers to these surface structures that are present on the surface of individual fibers, wherein these surface structures are located substantially normal to the axis of the fiber. The descriptive term "surface structures" shall also be used interchangeably with "roughness" to describe the roughened features. The term "microscopic surface structures" on a fiber surface generally refers to those surface structures that are smaller in size than the diameter of the fiber. The size of these microscopic surface structures is typically less than about 100 μm.

The roughness may be imparted to a fibrous surface in an additive or subtractive manner. Many of the prior art attempts to build rough structures used the additive approach by adding particles of various types to a surface, including textile surfaces. To make a high aspect ratio rough structure on a fiber surface using particles, either large particles or large concentrations of small particles should be applied to the surface. In either case, it is difficult to get a durable high aspect ratio roughened surface using particles alone on a somewhat smooth, flexible fibrous textile substrate. The particles tend to be abrasively or otherwise readily removed from the surface.

Alternatively, mechanical treatments, chemical treatments or combinations thereof may be employed in a subtractive approach to remove or redistribute material from the surface of a textile substrate to create these microscopic surface structures. The subtractive roughness approach has the advantage that the roughened microscopic surface structures of the fiber surface are attached to, and are part of, the underlying textile substrate. Roughening the textile substrate surface in this manner may be referred to as "integral" because the roughness does not result from the addition of new and different material to the fibers of the textile substrate. The chemical make-up of the roughened surface and the unroughened surface has not changed appreciably by the treatment process (i.e. no new material is appreciably added to the surface of the fiber or the textile substrate).

In the present invention, mechanical roughening of a textile surface, using the subtractive approach, may be preferentially employed to impart integral microscopic surface structures to the textile substrate for providing superior liquid repellent performance. Because the mechanically roughened surface structures are integral, they are not easily abraded or washed away during laundering or normal use. Therefore, integral surface roughness, or integral microscopic surface structures, leads to enhanced durability of the repellent properties of the textile substrate. This durability is generally necessary for textile substrates that are required to withstand abrasion and perhaps repeated laundering in their normal course of use. For illustrative purposes, FIGS. 5A and 8A illustrate regions of relatively high integral roughness as described herein.

In one embodiment of the present invention, roughness may be obtained by mechanically roughening the textile surface, according to techniques described in greater detail later, to generate a highly liquid repellent textile substrate. In this embodiment, at least one size range of microscopic surface structures may be imparted to the fibrous surface of the textile substrate. In another embodiment, the application of a repellent chemistry may be used in combination with the mechanical treatment to generate a highly liquid repellent textile substrate. In yet another embodiment of the present invention, particles, with diameters of nanometer to micron size, may be added to the mechanically roughened textile surface, before, after, or together with the application of a repellent chemistry to generate a highly liquid repellent textile surface. In this embodiment, roughened surface structures having at least two different size ranges are imparted to the fibrous surface of the textile substrate. The size ranges may be exclusive of each other such that the sizes do not overlap, or the ranges may be somewhat overlapping. These embodiments will be described in more detail below.

For the present invention, the methods for creating a highly liquid repellent roughened surface are applicable to a broad range of textile substrates. The textile substrate may be a fiber-containing textile substrate, such as a woven, knit, or nonwoven fabric, or a laid scrim. These fiber-containing textile substrates may be joined together in any combination to form a composite structure. The composite structure may include other materials, such as films, coatings, foams, reinforcing substrates, adhesives, and the like. The layers of the composite structure may be joined together using, for example and without limitation, adhesive, heat lamination, and combinations thereof.

The fiber-containing textile substrate may be formed from fibers such as synthetic fibers, natural fibers, man-made fiber using natural constituents or combinations thereof. Synthetic fibers include, for example and without limitation, polyester, acrylic, polyamide, polyolefin, polyaramid, polyurethane, regenerated cellulose, and blends thereof. More specifically, polyester includes, for example, polyethylene terephthalate, polytriphenylene terephthalate, polybutylene terephthalate, polylactic acid, and combinations thereof. Polyamide includes, for example, nylon 6, nylon 6,6, and combinations thereof. Polyolefin includes, for example, polypropylene, polyethylene, and combinations thereof. Polyaramid includes, for example, poly-p-phenyleneteraphthalamid (i.e., Kevlar®), poly-m-phenyleneteraphthalamid (i.e., Nomex®), and combinations thereof. Natural fibers include, for example and without limitation, wool, cotton, linen, ramie, jute, flax, silk, hemp, or blends thereof. Exemplary man-made materials using natural constituents include regenerated cellulose (i.e., rayon), lyocell, or blends thereof.

The textile substrate may be formed from fibers or yarns of any size, including microdenier fibers and yarns (fibers or yarns having less than one denier per filament). The fibers or yarns may be comprised of spun fibers, continuous filament fibers, bicomponent fibers, bicomponent splittable fibers, or blends thereof. The fibers may include slit film fibers or tape yarn.

As mentioned previously, one method for imparting integral roughness to the textile substrate is via mechanical face-finishing. For purposes of this invention, the term "face-finishing" or "face-finished" refers to any one of the methods or techniques for abrading, sanding, blasting, roughening, or mechanically altering the surface of a fibrous textile substrate as, for example, by methods and techniques described in the referenced patents and publications. For instance, U.S. Pat. Nos. 6,112,381; 5,815,896; 4,512,065; 4,316,928; and 4,468,844 each describe various types of mechanical face-finishing treatments for textile substrates. Some examples of these mechanical face-finishing techniques include, for example, sanding or abrading with an apparatus (such as a roll) coating with abrasive grits (such as diamond, SiC, $SiO_2$, $Al_2O_3$, TiC, WC, etc.), particle blasting (such as sand blasting), exposing the substrate to high temperature fluid, such as water or air, and the like. For the present invention, all of these face-finishing techniques, and variations thereof, may be used alone or in combination to roughen the textile substrate surface and create microscopic surface structures on the surface of the fibers contained therein. Variations or modifications to these techniques may include process alterations which allow for effective roughening of the surface of the textile substrate without breaking a substantial number of the fibers contained therein.

A potentially preferred, non-limiting, mechanical means of face-finishing a textile substrate includes exposing the textile substrate to an abrasive surface that may be stationary, oscillating or rotating in relation to the textile substrate. The abrasive surface may be coated with sandpaper, diamond, or other abrasive particles. If a rotating, cylindrical roll is used, it may be presented to the textile substrate, either normal to the length of the textile (i.e. perpendicularly across its width) or at an angle to the length of the textile, to control which areas or portions of the textile surface receive more or less treatment. For example, in a woven fabric for a specific application, it may be most desirable that the warp yarns, rather than the fill yarns, receive the bulk of the roughening treatment. In order to control such treatments, various parameters of the process may be adjusted to achieve the desired results. Such parameters include, for example, (a) the tension of the textile substrate as the abrasive roll is presented, (b) the engagement pressure of the abrasive roll, (c) the relative speed of the roll's rotation compared to the textile's translation, (d) the residence time of contact between the abrasive roll(s) and the textile, and (d) the abrasive grit size on the treatment roll.

Frequently, conventional face-finishing techniques are used to impart certain characteristics to a fabric such as, for example, to impart a more desirable hand (which includes softness of the surface), to improve drapeability of the fabric, to improve wickability of the fabric, etc. In order to impart these characteristics to a textile substrate, conventional techniques, (using rotating abrasive rolls with 400 grit or coarser) are often used to purposefully break fibers and make dense areas of short, broken fibers or loose fibers, which in turn, increases the "hairiness" of the textile substrate surface. For the purpose of the present invention, these broken fibers and the increased hairiness of the substrate are considered undesirable features of the textile substrate due to the fact that a broken fiber, which may be considered as a fiber that substantially projects out from the surface of the textile substrate, may serve as an obstacle to liquid rolling off of that surface. As a result, a substrate having many broken fibers on its surface will tend to reduce the liquid repellency of the substrate. In practice, broken fibers can be identified in a surface image because they are generally fibers that show a definite end or tip which projects out from the surface of the textile. They may also be identified as fibers that have been moved substantially away from their initial location so that a substantial portion of the fiber projects out from the surface of the textile. This latter case can occur when, for instance, a fiber can be seen in an image of a woven fabric that has moved away from its initial yarn bundle and has crossed over or into a different yarn bundle. The short fiber tips or ends that regularly present at the surface of staple or spun yarns prior to the face-finishing treatment generally are not considered to be broken fibers for the purpose of the present invention.

The surface of a textile substrate, treated in the manner conventionally practiced in the prior art of mechanical face-finishing, is illustrated in FIG. 6. A substantial amount of broken fibers and/or filaments can be seen on the surface of substrate 40. In fact, the broken fibers are the dominant feature on that surface. A scale showing 1 mm is evident near the lower portion of FIG. 6, enabling an estimation of the approximate size of the surface features. The number of broken fibers per square millimeter can be counted on typical textile substrates treated in this manner, and it has been found to be in the range of about 9 to about 30 when treated with the coarse abrasive treatments in the prior art. As mentioned previously, these long, broken fibers that project out from the textile substrate surface have been found to be detrimental to creating a super liquid repellent self-cleaning textile substrate. Therefore, mechanical face-finishing treatments, as practiced conventionally in the prior art, generally do not impart microscopic surface structures to textile substrates that are useful for super liquid repellency.

To create a textile substrate having super liquid repellent properties, it has been found that mechanical face-finishing treatments may be used in an unconventional manner to impart surface roughness to the substrate. As illustrated in FIG. 5, the face-finishing processes utilized in the present invention may provide a level of roughening that is much lighter or finer than is customarily practiced in the industry, to lightly roughen, but not break, the fibers or filaments on the surface of the textile substrate. The textile substrate surface that has been mechanically face-finished according to methods of the present invention, as shown in FIG. 5, is far different from the one that has been face-finished in the manner of the prior art, as shown in FIG. 6. Accordingly, the ability to use mechanical face-finishing techniques to create a super-hydrophobic textile substrate, when compared with the purposes of conventional face-finishing techniques, is considered to be a novel and unobvious method for imparting the lotus-effect to a textile substrate.

To obtain the inventive treatments described herein using mechanical face-finishing via abrasive sanding, very fine grit abrasive or sanding rolls, wherein the rolls are coated with abrasive grit in the range of between about 600 and about 1200 grit, or finer, have been utilized. These abrasive rolls are able to roughen large areas of the surface of fibers without breaking a significant number of fibers. Thus, they are able to create desirable integral microscopic surface structures on the surface of the fibers, which results in a textile substrate having durable super liquid repellency. The number of broken fibers which have been found to be detrimental to creating a super liquid repellent, self-cleaning textile substrate according to the present invention is substantially less than the number of broken fibers observed on a textile substrate treated by traditional face-finishing techniques. The number of broken fibers observed on the inventive treated substrate is typically less than about 5 fibers per square millimeter, and preferably less than about 3 fibers per square millimeter. In some cases, it has been observed that a broken fiber may lie substantially in the plane of the textile substrate, rather than protruding out from the surface of the substrate.

For purposes of this invention, "in the plane of the fiber-containing substrate" or "in the plane of the textile substrate" may be interpreted by the following discussion. A textile substrate is generally manufactured or provided in a sheet form. In application, the textile substrate has a sheet character, at least piecewise. The plane of the fiber-containing substrate may be determined, at least locally, by the sheet of the textile substrate. Operationally, the substrate may be placed, smoothed out and unwrinkled, on a flat horizontal supporting surface, and the supporting surface may be used to determine the plane of the substrate.

The specific distribution of roughened surface structures imparted to the surface of a textile substrate by the mechanical roughening taught in the present invention is very characteristic and different from those imparted to by other means. If, for example, the yarns or fibers that make up the textile substrate were roughened before incorporation into the textile structure, a uniform distribution of roughened surface structures on the yarn or fibers would be expected. In contrast, the inventive method of treating a textile substrate with an abrasive roll results in a more non-uniform distribution of roughened surface structures.

In particular, for some textile substrates, the fibers may be grouped into yarn bundles. Mechanically treating a textile surface with an abrasive roll tends to treat the elevated portions of the textile substrate. Depending on the normal force that keeps the textile in contact with the abrasive treatment roll, a different amount of the elevated portions on the surface may be treated. Also, mechanically face-finishing a textile substrate does not tend to roughen the inner fibers of a yarn bundle, since the inner fibers tend to be protected by the outer fibers of the yarn bundle. Furthermore, fiber-containing textile substrates, such as woven fabrics, may possess roughened surface structures on either one or both of the elevated and depressed regions characteristic of a woven fabric (i.e. warp yarn bundles and fill yarn bundles) without exhibiting any substantial increased bulk to the fabric.

Additionally, depending on the angle or orientation of the abrasive roll, fibers with different orientations within the textile substrate may be treated differently. For instance, many prior art abrasive roll treatment systems preferentially treat the fill yarns of a woven structure. Accordingly, when an abrasive roll is used to mechanically roughen a textile surface, while the entire top or bottom surface of a fibrous textile substrate may be treated, the entire top or bottom surface of a textile substrate may not be roughened uniformly. The percentage of the textile substrate surface that has been treated according to the current invention has been determined, on average, to be approximately 20%, as will be disclosed in more detail in the Examples section below. It may seem surprising that treating only relatively small portions of a textile substrate surface may give such a dramatic improvement in liquid repellency, but the only surface areas that contribute significantly to liquid repellency are the those most likely to be contacted by an impinging liquid, which are primarily the elevated portions of the surface that have been mechanically roughened. This non-uniform distribution of surface roughness is contemplated to be exhibited by mechanically roughened woven, knit, nonwoven and laid scrim substrates. It is anticipated that increasing the percentage of the roughened portions of the textile substrate may improve the liquid repellency performance even further.

Another aspect of mechanically roughening a textile substrate, rather than the yarns or fibers before incorporation into a substrate, is that a fiber that is on the top surface of a yarn at one point in the fabric may not be at the top surface at a different point in the fabric. Therefore, that fiber may be roughened in one part of the fabric and not in another part of the fabric. Accordingly, when an abrasive roll is used to mechanically roughen a textile surface, while the entire top or bottom surface of a fibrous textile substrate may be treated, the entire surface of the fibers or yarns comprising the surface of the substrate are generally not roughened. Accordingly, a roughened fiber may only be roughened over a part of its circumference and only along a portion of its length. To be of value in providing high liquid repellency, that roughened portion should be of a suitable length (at least to substantially cover the elevated regions of a fabric that a liquid drop will contact) and the roughened portion of the circumference of the fiber should be located substantially normal to the surface of the textile substrate. The fact that only a portion of the total surface area of the fibers that make up the textile substrate needs to be treated to provide high liquid repellent properties may be surprising. However, liquids that contact the surface of the textile substrate will not tend to wick into or penetrate the yarn bundle of a highly repellent textile substrate and further contact the inner fibers. This understanding allows for a much simpler and more economical treatment method, such as abrasive roll treatment of the whole textile, which can be easily implemented, rather than having to treat the entire surface of each fiber or yarn, though this type of treatment may effective as well.

The degree of roughening imparted to a fiber has been quantified for a number of textile substrates, as described in detail below. In general though, if a roughened fiber is examined microscopically along a roughened portion of the edge substantially away from any broken fiber ends or tips, the length of the profile (basically, a shadow) of the roughened fiber can be measured. The ratio of that roughened profile length to the rectilinear length along the fiber serves as a Roughness Factor (R. F.). In general, fibers removed from textile substrates treated according to the current invention have Roughness Factors equal to or larger than 1.10, as will be discussed in detail later.

Based on the preceding detailed discussion, the invention can be described in one embodiment as a fiber-containing substrate with a first surface and a second surface having integral microscopic surface structures upon at least a portion of at least one of its surfaces, wherein said microscopic surface structures have projections substantially normal to the plane of said fiber-containing substrate, said at least one surface comprised of portions having a plurality of substantially unbroken fibers comprising surface structures along at least part of the length of said fibers, and wherein said fibers have a Roughness Factor greater than or equal to about 1.10. It may be more preferable that the Roughness Factor is greater than or equal to 1.20, and even more preferable, greater than or equal to 1.30. A liquid repellent chemical treatment may be applied to the fiber-containing substrate if the substrate material itself is not liquid repellent already. Typically, the fiber-containing substrate may have integral microscopic surface structures upon at least 10% of at least one of its surfaces in order to achieve superior liquid repellent properties. However, it may be more preferable to have integral microscopic surface structures upon at least 15% of at least one of its surfaces, and even more preferable, upon at least 20% of at least one of its surfaces.

In the above description, "substantially normal to the plane of the fiber-containing substrate" shall mean that the object, specifically the surface structure, has a sizeable component that projects away from, or into, or is substantially perpendicular to the plane of the fiber-containing substrate, as defined previously. For the projections normal to the plane of the textile substrate to enhance liquid repellent performance, they should be on a top surface, or a contact surface, of the textile substrate.

In other embodiments, an additional particulate component may be added to at least one of the surfaces of the fiber-containing textile substrate before, after or together with the application of a repellent component to form another size scale of roughness. It should be mentioned that the additional surface area provided on the fiber-containing textile substrate by the mechanical roughening treatment also results in more anchor points for attaching particles and/or chemicals to the textile substrate surface, thereby allowing the particles and chemicals to become more durably adhered to the surface of the textile substrate. Other mechanical means of roughening the textile substrate surface could also be practiced within the scope of the invention. In general, any face-finishing treatment may be employed that achieves the desired fiber Roughness Factor, an effective percentage of treatment surface area, and/or the desired Dynamic Rolling Angle.

In addition to using mechanical face-finishing techniques to roughen the surface fibers of a textile substrate, a chemical treatment using, for example, fluorocarbon-containing compositions or other liquid repellent compositions, may be applied to the textile substrate to convert non-liquid repellent elements of the substrate into liquid repellent elements. If the substrate is already liquid repellent, the additional repellent chemical treatment may not be necessary. Furthermore, another size scale or size range of roughness, in addition to the integral microscopic surface structures formed by face-finishing, may be obtained through the addition of nanometer-sized particles to the textile substrate surface. It is believed that these small particles, when properly made hydrophobic, will mimic the nano structures of the waxy crystals previously mentioned on the Lotus leaf. Surprisingly, it has been found that textile substrates which receive mechanical face-finishing treatment and then subsequently receive a treatment of a fluorocarbon-containing component and a particulate component (preferably having a particle size of less than 1000 nanometers) exhibit superior performance properties, including an elevated Roughness Factor (R.F.), as herein defined, and a lowered Dynamic Rolling Angle (DRA).

In some applications of the invention, it is useful to apply crosslinking agents as well as repellent compounds. Repellent compounds may include fluorocarbon-containing repellent compounds. In one embodiment, aqueous compositions comprising a fluorochemical dispersion and a crosslinking agent may be used to treat the face-finished textile substrates. In another embodiment, aqueous compositions comprising hydrophilic particles, a crosslinking agent, and a fluorochemical dispersion may be used to treat the face-finished textile substrates. Application of the chemistry to the textile substrate may be accomplished by a variety of application methods which include, but are not limited to, coating, padding, spraying, foam coating, printing, exhaustion techniques or by any other technique whereby one can apply a controlled amount of a liquid suspension to a textile substrate. Employing one or more of these application techniques may allow the chemical to be applied to the textile substrate in a uniform manner.

The chemical agents may be applied simultaneously or sequentially to the textile substrate. For example, in one embodiment, a mixture comprising a repellency agent, a particulate agent, and a crosslinking agent, which are mixed together in one bath, is applied simultaneously to the textile substrate by, for example, padding. After application of the chemical agents to the textile substrate, the treated substrate is exposed to a drying step to evaporate excess liquid, leaving the solid active components on the surface of the treated substrate. Drying can be accomplished by any techniques typically used in manufacturing operations, such as dry heat from a tenter frame, microwave energy, infrared heating, steam, superheated steam, autoclaving, or the like, or any combinations thereof. In another embodiment, a mixture comprising a particulate component (with or without a crosslinking agent) is applied to the textile substrate, the substrate may be dried or left wet, and then a mixture comprising a repellency agent and a hydrophobic crosslinking agent is applied on top of the particulate component, creating a sequential chemical treatment on the surface of the textile substrate. The substrate is then dried. In yet another embodiment, a mixture comprising a repellent agent (with or without a crosslinking agent) is applied to the textile substrate, the substrate may be dried or left wet, and then a mixture comprising a repellency agent, a particulate agent, and a hydrophobic crosslinking agent is applied on top of the repellent agent previously applied, creating a sequential chemical treatment on the surface of the textile substrate. The substrate is subsequently dried.

It may be desirable to expose the treated textile substrate to an additional heating step to further enhance the performance or durability of the chemical agents. This step may be referred to as a curing step. By way of example, additional heating may (a) enable some of the active components of the chemical agents to melt-flow together, resulting in uniform, cohesive film coverage on the surface; (b) induce preferred alignment of certain segments of the chemical agents; (c) induce crosslinking reactions between the chemical agents or between the chemical agents and the substrate; or (d) combinations thereof.

In many instances, for a textile substrate to perform satisfactorily, regardless of its end-use application, other attributes, in addition to durable liquid repellent self-cleaning properties, may be desirable. Examples of such attributes include, but are not limited to, static protection, wrinkle resistance, desirable hand (or feel) requirements, dyefastness requirements, odor control, flammability requirements, resistance to dry soiling, and the like. In such cases, the textile substrate may be treated with various other chemical finishes, in addition to those described previously. For example, it may be desirable to treat the textile substrate with finishes containing chemicals such as antimicrobial agents, antibacterial agents, antifungal agents, flame retardants, UV inhibitors, antioxidants, coloring agents, lubricants, antistatic agents, fragrances, and the like, or combinations thereof. Many such chemical treatments can be incorporated simultaneously with the chemical composition of the current invention, or such treatments may be carried out prior to treatment with the chemical composition of the current invention. It is also possible, using appropriate techniques, to apply many such chemical treatments after treatment with the chemical composition of the current invention.

Additionally, the textile substrate may also be treated by typical mechanical finishing techniques to achieve desired appearance, strength, porosity, and/or hand of the fabric. For example, it may be desirable to expose the textile substrate to mechanical treatment such as calendaring, embossing, etching, rainbow or hologram embossing, film or metal foil hologram embossing, fabric metallization, heat setting, sanforizing, glazing, schreinering, sueding, sanding, emorizing, napping, shearing, tigering, decating, fabric patterning through the use of water, air, or patterned rolls, and the like, or combinations thereof. Depending on which mechanical treatment is utilized, advantages may be obtained by treatment either before or after the mechanical and/or chemical treatment of the current invention is applied. By way of example, in addition to creating roughness on a first surface of a textile substrate, benefits from subsequently calendaring a second surface of the textile substrate, without significantly affecting the roughness structures already created on the first surface, prior to chemical treatment may be envisioned. In such instances, the hydrostatic properties of the substrate may be improved significantly without affecting the highly liquid repellent, self-cleaning properties created on the first surface of the textile substrate.

Within the scope of the current invention, it is also contemplated that asymmetric textile substrates may be created with surfaces having dual functional attributes. For example, a textile substrate, having a first and a second surface, may be produced that possesses a first hydrophobic surface and a second hydrophilic surface. Such a dual functional textile substrate may be made, for example, by face-finishing the first surface to create integral microscopic surface structures, coating both surfaces of the textile substrate with a hydrophilic chemical agent, and then coating the first surface of the substrate with the chemical treatment of the present invention. Alternatively, the first surface may be face-finished to create integral microscopic surface structures, and the hydrophilic chemistry may be applied only to the second surface. Chemical application methods include any of those previously discussed, such as spray coating, foam coating, and the like. As a result, textile substrate made in this manner may provide increased protection from environmental or chemical assault by repelling liquids on the first surface of the substrate and, at the same time, provide increased user comfort by absorbing moisture, such as perspiration, on the second surface of the substrate. Clearly, these are desirable features if, for example, the textile substrate is used in apparel applications.

It is noted that attempts made by others to create the Lotus-Effect surfaces using only hydrophobic particles (and without using fluorochemicals) do not exhibit any repellency against wetting components, such as oil, although they may exhibit some level of repellency against water. The textile substrate treated according to the present invention, however, exhibit both super water repellency and superior oil repellency. More specifically, drops of oil, such as corn oil, may bead up and roll off the surface of the treated textile when the textile is tilted at an angle, without leaving behind a substantial trace of the oil.

Turning to FIG. 5, a fiber-containing textile substrate 20 is shown having a first side with a fibrous surface. A scale showing 100 μm is evident near the lower portion of FIG. 5, enabling an estimation of the approximate size of the microscopic surface structures. FIG. 5 corresponds to the flat woven polyester fabric of Example 10 described in greater detail below. The fibrous surface comprises fibers 23–25 and fibers 30–32 extending upon the surface, as shown in FIGS. 5A and 5B. A scale showing 10 μm is evident near the lower portion of FIGS. 5A and 5B, enabling an estimation of the approximate size of the microscopic surface structures. First elevated regions 21a–c and second depressed regions 22a–c, which are characteristic of a woven textile substrate, are shown.

In this particular example, the substrate 20 is woven, and the roughened surface is caused by abrading the textile substrate with a fine diamond grit coated roll. The weave pattern causes the first elevated regions 21a–c to be higher than the second depressed regions 22a–c. Thus, the first elevated regions 21a–c receive much more roughening during the abrading treatment, while the second depressed regions receive much less roughening, and in fact may receive no roughening at all from such face-finishing treatment. This selective mechanical treatment of the textile substrate surface, wherein some regions are more likely to be roughened than other regions, is generally a function of the construction of the textile substrate. For instance, whether the substrate is a woven, knitted, nonwoven, or laid scrim structure affects the fiber orientation of and the placement within the textile substrate, thereby altering which regions or fibers (for example, the fill yarns versus the warp yarns in a woven substrate) may be roughened by the face-finishing treatment.

The inset box 21b of FIG. 5 is expanded in FIG. 5A, so that the detail can be seen of the first elevated regions 21b. Furthermore, the individual fibers 23–25 can be seen, with substantial surface roughness, resulting in features that mimic the Lotus leaf surface; that is, features that are desirable in creating and maintaining repellency and/or superior liquid repellency upon the textile substrate. This repellency is not easily lost during laundering, abrasion, or normal use of the textile substrate because the roughened surface is an integral part of the textile substrate surface. In addition, nanometer-sized particles, if utilized, are attached more durably to these roughened regions of the fibers because of the high surface area.

The inset box of 22b of FIG. 5 is expanded in FIG. 5B, and it shows an expanded view of second depressed region 22b. As can be seen, there is much less roughness and surface irregularity on the fibers 30–32 in this latter region. Thus, this region, due to its geometrical location, receives almost no surface roughening from the face-finishing treatment, as practiced in the invention. The relative percentage of the areas with substantial fiber roughness and the areas with significantly less fiber roughness may vary depending on the face-finishing treatment employed and the construction of the textile substrate. In fact, it may be the case that only those portions of yarns or fibers that are hidden from treatment, because they are at crossover points where, for example, the fill yarns physically cover the warps yarns in a woven construction, may show significantly less surface roughness.

FIGS. 5C and 5D illustrate the nanoparticles present on the surface of textile substrate 20 shown in FIG. 5. FIG. 5C shows the individual nanoparticles 41a–41c that are present on the surface of a roughened fiber. FIG. 5D shows that some of these individual nanoparticles may come together to form agglomeration 41d on the surface of a roughened fiber.

FIG. 7A shows a scanning electron micrograph image (SEM) (at 500× magnification) of roughened fiber 41 that has been pulled out from the tent fabric described in Example 6. Roughened fiber 41 is created by application of at least two different sized features—(a) microscopic surface structures on the fiber as a result of mechanical face-finishing treatment and (b) the addition of nanometer-sized particles which are applied to the fiber. FIG. 7B shows a close-up view of roughened fiber 41, and further views 7C, 7D, and 7E show the series of steps taken to measure the Roughness Factor (R.F.) of the fiber(s), which is further discussed below. The total length of the upper margin of the silhouette is measured relative to the linear length of the image box to determine the approximate or average amount of roughness imparted to the fiber surface within the first elevated regions, as indicated in the procedure outlined below.

FIG. 8A shows a SEM image (at 1000× magnification) of fiber 50 pulled out from the tent fabric described in Example 20 below and illustrates the microscopic surface structures formed on the fiber due to mechanical face-finishing. A corresponding silhouette, or profile, of this image is shown in FIG. 8B. A scale showing 10 μm is evident near the lower portion of FIG. 8A, enabling an estimation of the approximate size of the surface features. The roughness features generated on this fiber closely resemble those present on a Lotus leaf.

Repellent Components

There are numerous compositions that may be adapted to serve as the repellent component in the present invention. "Repellency" is generally defined as the ability of a substrate to block fluids, such as water and/or oil, from penetrating into a substrate. For example, the substrate may be a textile substrate which is capable of blocking water and oil from penetrating into the fibers of the textile substrate.

One composition that is particularly useful is a fluorochemical composition. The terms "fluorocarbons," "fluoropolymers," and "fluorochemicals" may be used interchangeably herein and each represents a polymeric material containing at least one fluorinated segment. Numerous fluorochemical compositions are known to be capable of achieving repellency on a textile substrate.

Generally, repellent fluorochemicals useful in the present invention include any of the fluorochemical compounds and polymers known in the art to impart dry soil resistance and water- and oil-repellency to fibrous substrates. These repellent fluorochemical compounds and polymers typically comprise one or more fluorochemical radicals that contain a perfluorinated carbon chain having from 3 to about 20 carbon atoms, more preferably from about 6 to about 14 carbon atoms. These fluorochemical radicals can contain straight chain, branched chain, or cyclic fluorinated allcylene groups or any combination thereof. The fluorochemical radicals are preferably free of polymerizable olefinic unsaturation but can optionally contain catenary heteroatoms such as oxygen, divalent or hexavalent sulfur, or nitrogen. Fully fluorinated radicals are preferred, but hydrogen or chlorine atoms may also be present as substituents, although, preferably, no more than one atom of either is present for every two carbon atoms. It is additionally preferred that any fluorochemical radical contain from about 40% to about 80% fluorine by weight, and more preferably, from about 50% to about 78% fluorine by weight. The terminal portion of the radical is preferably fully fluorinated, preferably containing at least 7 fluorine atoms, e.g., $CF_3CF_2CF_2-$, $(CF_3)_2CF-$, $SF_5CF_2-$. Perfluorinated aliphatic groups those of the formula $C_nF_{2n+1}-$) are the most preferred fluorochemical radical embodiments.

Representative repellent fluorochemical compounds useful in treatments of the present invention include fluorochemical urethanes, ureas, esters, ethers, alcohols, epoxides, allophanates, amides, amines (and salts thereof), acids (and salts thereof), carbodiimides, guanidines, oxazolidinones, isocyanurates, and biurets. Blends of these compounds are also considered useful. Representative fluorochemical polymers useful in treatments in the present invention include fluorochemical acrylate and substituted acrylate homopolymers or copolymers containing fluorochemical acrylate monomers interpolymerized with monomers free of non-vinylic fluorine such as methyl methacrylate, butyl acrylate, acrylate and methacrylate esters of oxyalkylene and polyoxyalkylene polyol oligomers (e.g., oxyethylene glycol dimethacrylate, polyoxyethylene glycol dimethacrylate, methoxy acrylate, and polyoxyethylene acrylate), glycidyl methacrylate, ethylene, butadiene, styrene, isoprene, chloroprene, vinyl acetate, vinyl chloride, vinylidene chloride, vinylidene fluoride, acrylonitrile, vinyl chloroacetate, vinylpyridine, vinyl alkyl ethers, vinyl alkyl ketones, acrylic acid, methacrylic acid, 2-hydroxyethylacrylate, N-methylolacrylamide, 2-(N,N,N-trimethylammonium)ethyl methacrylate, and 2-acrylamido-2-methylpropanesulfonic acid (AMPS). The relative amounts of various non-vinylic fluorine-free comonomers used are generally selected empirically depending on the textile substrate to be treated, the properties desired, and the mode of application onto the textile substrate. Useful fluorochemical treatments also include blends of the various repellent fluorochemical polymers described above as well as blends of the aforementioned fluorochemical compounds with these repellent fluorochemical polymers.

Commercially available examples of repellent fluorochemicals that can be used in conjunction with the current invention include, but are not limited to, the Scotchgard™ family of repellent fluorochemicals by 3M, the Zonyl™ family of repellent fluorochemicals by Dupont, the Repearl™ family of repellent fluorochemicals by Mitsubishi International Corporation. Repearl® F-8025 or Repearl F-7000 by Mitsubishi are particularly useful in the practice of the current invention. Other fluorochemicals, such as the Unidyne™ products distributed by Daikin America, Inc. or products distributed by OMNOVA Solutions may also be employed.

In addition to fluorochemicals, other repellent chemistry, such as repellent silicones, waxes, and the like, may also be employed in the practice of the present invention to achieve repellent properties. Repellent silicones are commercially available from GE Chemical, Dow Corning, Kelmar Industries, and others. Examples of the repellent silicones are Dow Corning 346 Emulsion available from bow Corning, Midland, Mich.; SE-40A available from Kelmar Industries, Duncan, S.C. Waxes can be obtained commercially from PetroLite, Allied Chemical, Cabot, Consos, and others. One example of the repellent wax is Consopel ZW, a zirconium wax based emulsion available from Consos, Inc., Charlotte, N.C.

Particulate Components

Various particulate materials, inorganic or organic, may be used in conjunction with the present invention. Preferably, the particles are comprised of at least one material selected from the group consisting of silicates, doped silicates, minerals, silicas, polymers, carbon, graphite, metal salts, metal powders, silica-coated metal powders, inorganic oxides (such as metal oxides), and the like, and combinations thereof.

More specifically, examples of particles that may be employed include, but are not limited to, silica, colloidal silica, alumina, zirconia, titania, zinc oxide, precipitated calcium carbonate, polytetrafluoroethylene (PTFE), perfluorinated copolymers, copolymers with tetrafluoroethylene, polyvinylpyrrolidone (PVP), and the like. Such particles can also be surface modified, for instance by grafting.

The size of the selected particles should be taken into consideration for several reasons. Particles that are too small may not provide appropriate surface roughness to trap air on the substrate surface or may require high loading with subsequent agglomeration to achieve the desired roughness features of the current invention. Particles that are too large may give a frosty, white appearance to dyed textiles or may be removed easily during use or routine maintenance of the textile substrate. In general, particle sizes of between about 1 nm and about 50 µm are believed to be capable of providing good results in various applications of the invention. Particle sizes in the range of between about 5 nm and about 1 µm are particularly useful, and particle sizes in the range of between about 10 nm and about 50 nm have been found to work well in some applications. These sized particles can be employed to build a nanometer scale roughness, similar to that of the wax crystals on the Lotus leaf, to augment the fiber roughness imposed by mechanical roughening or face-finishing, which results in microscopic surface structures that are generally less than 100 µm in size.

As used herein, the terms "inorganic oxide" or "metal oxide" refer to a general class of materials comprising at least one species of metal cation combined with oxygen anions or hydroxyl anions, or mixtures of oxygen and hydroxyl ions. This material can additionally contain water in bound or adsorbed form and can further comprise small amounts, for example less than 5% by weight, stabilized counter ions such as sodium ion, carboxylate ion, chloride ion, nitrate ion, or the like. For the purposes of the present invention, it is usually desirable that the metal oxides or inorganic oxides be in a very finely divided state. Colloidal dispersions provide a particularly useful form for use in the present invention.

The following may be utilized in the practice of the present invention, depending upon the specific application to be employed:

Nalco 1042™ Colloidal Silica—a 34% solids (by weight) aqueous colloidal acidic silica sol cation available commercially from Nalco Chemical Co. ("Nalco"), Naperville, Ill.

Nalco 1050™ Colloidal Silica—a 50% by weight solids aqueous colloidal silica sol available commercially from Nalco. The sol has a pH of 9, an average particle size of 20 nm in diameter;

Nalco 2326™ Colloidal Silica—a 15% by weight solids aqueous colloidal silica sol available commercially from Nalco. The sol has a pH of 9, an average particle size of 5 nm in diameter;

Nalco 2327™ Colloidal Silica—a 40% by weight solids aqueous colloidal silica sol available commercially from Nalco. The sol has a pH of 9, an average particle size of 20 nm in diameter.

Nalco 2329™ Colloidal Silica—a 40% by weight solids aqueous colloidal silica sol available commercially from Nalco. The sol has a pH of 9, an average particle size of 75 nm in diameter;

Nalco 1056™ Aluminized Silica—a 30% by weight solids aqueous colloidal suspension of aluminized silica particles (26% silica and 4% alumina) available commercially from Nalco;

Nalco 88SN-126™ Colloidal Titanium Dioxide—a 10% by weight solids aqueous dispersion of titanium dioxide available commercially from Nalco;

Nalco 88SN-123™ Colloidal Tin Oxide—a 22% by weight solids aqueous dispersion of tin oxide available commercially from Nalco;

Cab-O-Sperse S3295™ Fumed Silica—a 15% by weight solids aqueous dispersion of fumed silica available commercially from Cabot Corporation of Boyertown, Pa. The dispersion has a pH of 9.5, and an average agglomerated primary particle size of about 100 nm in diameter;

Cab-O-Sperse A205™ Silica available from Cabot Corporation;

Ludox AS40™ Colloidal Silica—a 40% by weight solids aqueous colloidal silica sol available commercially from Grace Davison, Columbia, Md. The sol has a pH of 9, an average particle size of 22 nm in diameter;

Ludox AM™ Colloidal Silica—a 30% by weight solids aqueous sol, available from Grace Davison. The sol has a pH of 9, an average particle size of 12 nm in diameter;

Ludox CL-P™ Colloidal Alumina Coated Silica—a 40% by weight solids aqueous sol, available from Grace Davison. The sol has a pH of 4, an average particle size of 22 nm in diameter;

Ludox TMA™ Colloidal Silica—a 34% by weight solids aqueous colloidal silica sol, available from Grace Davison. The sol has a pH of 4.7 and an average particle size of 22 nm in diameter;

Sipernat 22LS™ Hydrophilic Precipitated Silica—dry powder available from Degussa Corporation of Germany. The average particle size is 4.5 nm in diameter; and Viviprint 540™ poly(vinylpolypyrrolidone) particles with 10% by weight solids from ISP Technologies.

In some cases, particles having other functional properties may be used. Such particles may provide additional attributes beyond the structural building feature described herein. For example, AlphaSan® particles, available from Milliken Chemical of Spartanburg, S.C., may provide antimicrobial features to the textile substrate. Zinc oxide particles may offer odor-absorbing properties. Zelec™ particles, also available from Milliken Chemical, may provide antistatic properties. Zinc borate particles or antimony pentoxide may provide flame retardant and fungicide properties. Iron-based microparticles may provide magnetic and microwave-absorbing properties.

Crosslinking Component

Cross-linking components may optionally be employed in the invention, including cross-linking components that are essentially insoluble in water (i.e. hydrophobic). In other formulations, hydrophilic cross-linkers could be useful.

In other embodiments, hydrophobic cross-linking components may include protected derivatives of isocyanates and the like, or combinations thereof. Protected diisocyanates may be a suitable cross-linking component. Monomers or polymers containing two or more blocked isocyanate compounds may be the most preferred cross-linking components. One useful cross-linking component is REPEARL® MF™, available from Mitsubishi Corp. Others include ARKBPHOB® DAN (a polyurethane), available from Clariant, and HYDROPHOBOL® XAN™, available from DuPont.

Another useful cross-linking agent is Milligard MRX™, a polyurethane-based cross-linking agent available from Milliken Chemical of Spartanburg, S.C.

Description of Testing Methods a) Water Repellency Test

Water repellency was tested according to the 3M Water Repellency Test II (May, 1992). The rating scale is 0–10, with "0" indicating the poorest degree of repellency (substrates having higher surface energy) and "10" indicating the best degree of repellency (substrates having lower surface energy). The 3M Water Repellency Test scale is:

0 is 0% Isopropanol (IPA), 100% water (by weight)
1 is 10% IPA, 90% water
2 is 20% IPA, 80% water
3 is 30% IPA, 70% water
4 is 40% IPA, 60% water 5 is 50% IPA, 50% water
6 is 60% IPA, 40% water
7 is 70% IPA, 30% water
8 is 80% IPA, 20% water
9 is 90% IPA, 10% water
10 is 100% IPA A test sample was placed on a flat, horizontal surface. 3 small drops of the test liquid, approximately 5 mm in diameter, was placed gently in three different areas on the test sample using a dropper or pipette. The drops were allowed to stand undisturbed for 10 seconds. If after 10 seconds, two of the three drops are still visible as spherical to hemispherical, the sample passes the test. The numerical rating given to the sample is the highest numbered test liquid which remains visible.

b) Oil Repellency Test

Oil Repellency was tested according to the AATCC Test Method 118–2000. The rating scale is 0–8, with "0" indicating the poorest degree of repellency (substrates having higher surface energy) and "8" indicating the best degree of repellency (substrates having lower surface energy). The oil repellency scale is:

0 is Nujol™ Mineral Oil (the substrates wets with the oil)
1 is Nujol™ Mineral Oil
2 is 65/35 Nujol/n-hexadecane (by volume)
3 is n-hexadecane
4 is n-tetradecane
5 is n-dodecane
6 is n-decane.
7 is n-octane
8 is n-heptane A test sample was placed on a flat, horizontal surface. Beginning with the lowest numbered test liquid, a small drop of the test liquid, approximately 5 mm in diameter, was placed gently in several different areas on the test sample using a dropper or pipette. The drops were allowed to stand undisturbed for 30 seconds and observe the drop at a 45° angle. If after 30 seconds, no penetration or wetting of the sample substrate at the liquid-substrate interface and no wicking around the drop occurs, the sample passes the test. The numerical Oil Repellency Rating given to the sample is the highest numbered test liquid which will not wet the substrate within a period of 30 seconds.

c) Spray Rating Test

The Spray Rating Test was conducted in accordance with AATCC (American Association of Textile Chemists and Colorists) Test Method 22–2000. The rating scale is as follows:

100—No sticking or wetting of upper surface
    90—Slight random sticking or wetting of upper surface
    80—Wetting of upper surface at spray points
    70—Partial wetting of whole of upper surface
    50—Complete wetting of whole of upper surface
    0—Complete wetting of whole upper and lower surfaces.

d) Dynamic Rolling Angle (DRA) Test

It is difficult to compare the repellent properties of a highly hydrophobic surface, such as that of the present invention, using conventional contact angle measurement methods because it is very difficult to measure a high contact angle (>150°) reliably. On a textile substrate, it is even more difficult because of the not-well-defined base line caused by the textile construction. A water droplet dynamic rolling angle test was used instead. Here, the dynamic rolling angle is defined as the minimum angle of a surface at which a water droplet will roll pass a predetermined distance when the water droplet was dropped onto the pre-inclined surface. Smaller dynamic rolling angle values indicate higher repellency.

The dynamic rolling angle is determined by the following procedure.

A sample is mounted on a measurement bench that is 6 inches by 4 inches in size and whose inclination can be adjusted from 0 to 90 degrees relative to horizontal. The sample is under moderate tension to smooth out any wrinkles. The sample is then blown with a bench top air ionizer to dissipate any static charges that might be present on the surface. Deionized water droplets, with a predetermined mass (typically 11–12 mg), are dropped onto the pre-inclined sample across the width of the sample from a distance of 1 cm above the sample surface using a syringe needle. By adjusting the angle of inclination in increments, the minimum angle of inclination at which at least 5 water droplets will roll past a predetermined distance is recorded. The predetermined distance is typically 3 cm.

e) Home Wash Procedure

The Home Wash Procedure undertaken to test for wash durability was conducted in accordance with AATCC Test Method 130–2000, using wash procedure 1 (105° F. wash) and Tide® Quick Dissolving Powder detergent.

"Wash durability" is generally defined as the ability of a substrate to retain an acceptable level of a desired function through a reasonable number of standard laundering cycles. The substrate may be a textile substrate, such as a fabric.

f) Martindale Abrasion Test

The Martindale Abrasion Test was performed according to ASTM D4966-98 modified using a Mark III Abrasion Tester BS5690 (Shirley Developments Ltd.). A 7 inch×7 inch sample was mounted onto the test station. A woven wool fabric, which was placed on the abrasion cylinder (without extra weight), was used as the abrasive material. The fabric was a plain weave crossbred worsted wool fabric with a mass of 5.8 oz/yd$^2$ available from TexFabric Inc., West Pittston, Pa. The fabric was comprised of R63 Tex/2 warp yarns and R74 Tex/2 fill yarns woven together in a plain weave construction with 43 ends/inch and 30 picks/inch. The warp yarns were made from 27.5 μm diameter wool fibers in a single 540 TPM z twist and the fill yarns were made from 29 μm diameter wool fibers in a single 500 TPM z twist. The sample was then exposed to a predetermined number of abrasion cycles.

Further Detailed Description

A) Mechanical Roughening Treatment

The textile substrate (such as for example a woven, knitted, or nonwoven fabric, laid scrim) was roughened with a face-finishing process. This involved gently roughening the surface of the substrate using a series of diamond-coated rolls (or sandpaper in some cases) with a specific grit size or combination of grit sizes. It is envisioned that any machines known in the art for sanding abrasion could be used with appropriate grit sizes for treatment. Additionally, it is contemplated that chemical swelling agents may be used before or during the face-finishing treatment to enhance the treatment effectiveness. The face-finishing process was performed at an unconventionally low level such that at least a portion of the surface was roughened without generating a significant amount of broken fibers on the fibrous textile substrates. Other means of roughening the textile substrate surface may also be employed, such as, for example, fine particle blasting, laser ablation, plasma treatment, and chemical etching (such as with acid). Thus, chemical means, mechanical means, or any other means, or combination thereof of roughening the surface of the textile substrate surface may be employed.

In the Examples presented herein, the substrate pretreatment was performed according to the following procedure:

A piece of fabric was cut to a size of approximately 13 inches×60 inches. The two ends of the fabric were sewn together to form a loop. The fabric was then mounted on a proprietary homemade abrasion machine so that the loop of the fabric is presented to the abrasive roll. The tension of the fabric was controlled by an air-filled cylinder. The fabric was running at a speed of approximately 8 yards per minute. For a balanced treatment, the fabric was typically treated in both directions with the same number of cycles. The level of treatment depends on the grit of the treatment roll (g), tension of the fabric, which is determined by the pressure of the cylinder (p), and the number of cycles the fabric was exposed to (n). The level of treatment is denoted by g-p-n. For example, 1200-30-12 means the fabric was treated with a 1200 grit roll at 30 psi cylinder pressure for 12 cycles in each direction. In general, a grit of between about 600 and about 1200 has been found to be quite useful in the practice of the invention. Typically, only a portion of the fabric surface is roughened by the face-finishing process. The percentage of the roughened areas over the total surface area depends on the fabric construction and may be estimated from representative scanning electron microscope pictures. The procedures to estimate the percentage of the roughened areas are described in details below. Because of the fine grit rolls are used in the present invention, the number of broken fibers per unit area that are caused by the face-finishing process of the present invention is substantially less than that caused by the traditional face-finishing process which uses coarse grit rolls.

B) Procedure Employed to Determine the Percentage of Surface Area Roughened

All images were captured as described in detail in the section below on SEM imaging and Sample Preparation for Measuring Surface Roughness and Determining Roughness Factor. The treated fabrics are positioned in the SEM so that a clear image of the surface, positioned so that surface roughness caused by protrusions, scuffing, particles, etc. can be clearly seen, can be produced. The digital images were 800 pixels long by 600 pixels high. The images were captured at 50× magnification of the fabric surface. The image files were saved as 8 bit RGB files in a jpeg format. For example, FIG. 5 shows the initial image of Fabric Q, Example 10, as obtained from the SEM. To focus on the percentage of the fabric surface that is roughened (i.e. shown as regions 21b), a portion of the image can be extracted that focuses only on the treated surface of the textile, as shown in FIG. 9A. The treated surface of the textile substrate in this case corresponds to those first elevated regions 21b that received a face-finishing treatment and results in these regions having significant surface roughness. These regions 21b, as will be described in more detail below, typically have a Roughness Factor of greater than or equal to 1.10. The actual dimensions of the sample shown in FIG. 9A are 2.4 mm wide by 1.48 mm high. A minimum surface area in this range is required for this analysis.

For analysis, two software packages were employed: Adobe Photoshop 6.0.1, as offered by Adobe Systems Incorporated of San Jose, Calif., and Image Pro Plus 4.5, as offered by Media Cybernetics, Inc of Silver Spring, Md. The extracted images were converted to an 8-bit grayscale (each pixel takes on a gray value from 0, or black, to 255, or white) image in Image Pro Plus. The extracted file was then transferred to Adobe Photoshop. To separate the pixels of the image that represent roughened surface of the textile (regions similar to 21b) from un-roughened textile surface (regions similar to 22b), a 3-pixel diameter eraser tool was used to tag those pixels in the image where surface fibers were roughened. To do this, the eraser tool was set to convert all pixels that it crossed over while activated to black, a pixel value of 0. Using a mouse with the magnified image (200% or greater on the screen in Adobe Photoshop), those portions of the 50×SEM image where process-imposed surface roughening (fibers that were roughened and remained substantially in a plane parallel to the surface of the textile) was evident were traced accurately by hand to set those image pixels to 0. FIG. 9B shows the same image as FIG. 9A, but with the roughened portions of the textile surface (all of the regions similar to 21b) set to black (pixel value of 0) by the procedure described above. This image is saved as a TIFF file for later analysis in Image Pro Plus.

Using Image Pro Plus, the image file (e.g. as in FIG. 9B) where the pixels representing roughened surface are set to black (pixel value of 0) is opened. This image will be used to calculate the percentage of the surface area that is roughened. In principal, the percentage of surface area treated (PS) will be calculated as the percentage of the black pixels that represent roughened areas of the surface compared to the total number of pixels in the surface image. To determine PS, Image Pro Plus allows the user to select portions of an image based on the portion's pixel value and size. Because the pixels representing roughened surface have been set to black (a pixel value of zero), the background can be selected from the image by segmenting out (selecting) the pixels that have a value near 0. There are some complications. Because there can be shadows in an image, there are some pixel objects that have numerical pixel values near zero but do not represent the roughened portion of the surface. These pixel objects invariably include much fewer pixels than the roughened portions of the surface. Therefore, the analyst can exclude shadows from the profile by requiring that the pixel objects that are tagged as the background have a pixel size larger than the sizes of the shadows in the image (this will vary depending on the image). For completeness, it will be indicated that the roughened surface object pixels are counted so that any pixel "holes" in a big background of selected pixels are automatically selected, and pixels should be neighboring each other in a 4-connected sense to be tagged as part of the background. This means that objects in an image should be connected to the main body of the image by having a neighbor directly above, below or on either side of the specified pixel; pixels that are connected through a diagonal only will not be included in the selected background object. An example of the tagged surface roughness image for FIG. 9B is shown in FIG. 9C. In this case, the pixels representing the portion of the surface that is roughened (all regions similar to 21b) are set to 255 (i.e., white) and the pixel values for everything else are set to 0 (i.e. black). The image has been converted into a binary image where there are only white pixels and black pixels.

With the image as in FIG. 9C in hand, the task is to measure the number of pixels that are white (roughened) and the total number of pixels in the image. Using the segmentation tools in Image Pro Plus, the number of pixels that represent roughened portions ($X_R$) can be counted in this example as all pixels that have a value of 255 (white). The total number of pixels in the image ($X_T$) can be obtained from the bitmap in Image Pro Plus or again counted with the segmentation tools where no segmentation level is set. The percentage of the surface area roughened PS can now be calculated as:

$$PS = X_R/X_T.$$

C) Chemical Application Procedures:

All Examples utilizing textile substrates provided below were treated according to one of the following procedures and are noted accordingly. I) One-step application procedure:
1. A piece of fabric approximately 13 inches×17 inches was immersed into a bath containing the chemical composition comprised of the desired chemical agents.
2. Unless otherwise stated, all chemical percents (%) were % by weight based on the total weight of the bath prepared, and the balance remaining, when chemical percents or grams of chemical are given, is comprised of water. In addition, the % chemical was based on the chemical as received from the manufacturer, such that if the composition contained 30% active component, then X % of this 30% composition was used.
3. After the fabric was completely wet, the fabric was removed from the treatment bath and run between squeeze rolls at a pressure of about 40 psi to obtain a uniform pickup generally between about 30 and about 100%.
4. The fabric was pulled taut and pinned to a frame to retain the desired dimensions.
5. The pin frame was placed into a Despatch oven at a temperature of between about 350 and about 380 degrees F. for between about 5 and about 10 minutes to dry and to cure the finish.
6. Once removed from the oven, the fabric was removed from the pin frame and allowed to equilibrate at room temperature prior to testing.

II) Two-Step Application Procedure:
1. The one-step application procedure was repeated, except that rather than adding all the chemical agents to one chemical bath, one or more chemical agents comprising the chemical composition were separately applied to the fabric in a specified order as described below.
2. The fabric was immersed into a bath containing one or more of the chemical agents comprising the chemical composition.
3. After the fabric was completely wet, the fabric was removed from the bath and run between squeeze rollers as described in the one step application procedure.
4. The fabric was dried at a temperature of between about 300 and about 350 degrees F. for about 5 minutes in a Despatch oven. (This drying step is optional. The fabric may remain wet, while proceeding to the next step.)
5. The fabric was then immersed into a fresh second bath containing the desired chemical agents comprising a second chemical composition.
6. The fabric was then dried and cured as described in the one step application procedure.

III) Spraying Application Procedure:
1. A piece of fabric approximately 13 inches×17 inches was pulled taut and pinned to a frame.
2. The fabric was then sprayed with the chemical composition comprised of the desired chemical agents using an airbrush Model 150 (Badger Air-Brush Co.) operated under 20 psi pressure. The spray operation was performed until the fabric surface was completely wet without dripping.
3. The pin frame was placed into a Despatch oven at a temperature of between about 200 and about 350 degrees F. for between about 5 and about 10 minutes to dry and to cure the finish.
4. Once removed from the oven, the fabric was removed from the pin frame and allowed to equilibrate at room temperature prior to testing.

Various embodiments of the invention are shown by way of the Examples below, but the scope of the invention is not limited by the specific Examples provided herein.

EXAMPLE 1

Microdenier Twill Fabric Face-Finished One Step Treatment

A 200 grams bath containing the following chemicals was prepared:
1. 2 grams (or 1%) of Sipernat 22LS™, hydrophilic silica particles available from Degussa Corporation of Germany.
2. 8 grams (or 4%) Repearl F-7000, a fluorinated stain repellent agent available from Mitsubishi Corp.; and
3. 2 grams (or 1%) Milligard MRX™, a cross-linking agent available from Milliken Chemical.

A 100% microdenier polyester fabric was treated with this chemical composition according to the one step application procedure described previously. The wet pickup of the chemical composition on the fabric was about 50%.

The microdenier polyester fabric was obtained from Milliken & Company of Spartanburg, S.C. The fabric was comprised of textured filament polyester 1/140/200 denier warp yarns and textured filament polyester 1/150/100 denier fill yarns woven together in a 2 by 2 right hand twill pattern having 175 warp yarns and 80 fill yarns per inch of fabric (hereinafter referred to as a "microdenier twill fabric" specifically for this invention). The fabric was roughened with a face-finishing process using a diamond coated roll at a level of 1200-30-32. Approximately 19% of the surface areas were roughened by the face-finishing process.

The treated fabric was tested for water and oil repellency, spray rating, dynamic rolling angle by the methods described previously for the as received ("AR") samples. The results are shown in Table 1A. The spray rating and dynamic rolling angle of the treated fabric were tested after 1 home wash, 5 home washes, 10 home washes, and 20 home washes. The test results are shown in Table 1B. The spray rating and dynamic rolling angle were also tested after 1000 cycles, 2000 cycles, 5000 cycles, 10000 cycles and 20000 cycles of Martindale abrasion. Test results are shown in Table 1C.

EXAMPLE 2

Microdenier Twill Fabric Face-Finished Two Step Treatment

The face-finished polyester microdenier twill fabric as described in Example 1 with the same level of face-finishing was treated in accordance with the two-step application procedure described previously. In the first step of the procedure, 2% of Ludox AM, colloidal silica particles with an average particle diameter of 12 nm available from Grace Davison, was applied to the fabric, and the fabric was subsequently dried. In the second step of the procedure, a mixture of 4.0% Repearl F-7000 and 1% Milligard MRX™ was subsequently applied to the fabric.

The treated fabric was tested for water and oil repellency, spray rating, dynamic rolling angle by the methods described previously for the as received ("AR") samples. The results are shown in Table 1A. The spray rating and dynamic rolling angle were tested after 1 home wash, 5 home washes, 10 home washes, and 20 home washes. The test results are shown in Table 1B. The spray rating and dynamic rolling angle were also tested after 1000 cycles, 2000 cycles, 5000 cycles, 10000 cycles and 20000 cycles of Martindale abrasion. Test results are shown in Table 1C.

COMPARATIVE EXAMPLE 3

Microdenier Twill Fabric No Particles and No Face-Finishing

Example 1 was repeated, except that the Sipernat 22LS™ component was eliminated from the bath and the microdenier twill fabric was not roughened with a face-finishing process.

The treated fabric was tested for water and oil repellency, spray rating, dynamic rolling angle by the methods described previously for as received ("AR") samples. The results are shown in Table 1A.

EXAMPLE 4

Automotive Twill Fabric Face-Finished One Step Treatment

Example 1 was repeated except that the microdenier twill fabric was replaced by an automotive upholstery polyester fabric. The wet pickup of the chemical composition on the fabric was about 98%.

The automotive upholstery polyester fabric was obtained from Milliken & Company of Spartanburg, S.C. The fabric was comprised of textured filament polyester 2/150/34 denier warp and fill yarns woven together in a 2 by 2 right hand twill pattern (hereinafter referred to as a "automotive twill fabric" specifically for this invention). The fabric was dyed with a light brown color. The fabric was roughened with a face-finishing process using a diamond coated roll at a level of 1200-30-24. Approximately 20% of the surface areas were roughened by the face-finishing process.

The treated fabric was tested for water and oil repellency, spray rating, dynamic rolling angle by the methods described previously for as received ("AR") samples. The results are shown in Table 1A. The spray rating and dynamic rolling angle were tested after 1 home wash, 5 home washes, 10 home washes, and 20 home washes. The test results are shown in Table 1B. The spray rating also tested after 1000 cycles, 2000 cycles, 5000 cycles, 10000 cycles and 20000 cycles of Martindale abrasion. Test results are shown in Table 1C.

COMPARATIVE EXAMPLE 5

Automotive Twill Fabric No Particles and No Face-Finishing

Example 4 was repeated, except that the Sipernat 22LS™ component was eliminated from the bath. The fabric was not roughened with a face-finishing process.

The treated fabric was tested for water and oil repellency, spray rating, dynamic rolling angle by the methods described previously for as received ("AR") samples. The results are shown in Table 1A.

EXAMPLE 6

Polyester Tent Fabric Face-Finished One Step Treatment

Example 1 was repeated except that the microdenier twill fabric was replaced by a polyester tent fabric. The wet pickup of the chemical composition on the fabric was about 88%.

The polyester tent fabric was obtained from Milliken & Company of Spartanburg, S.C. The fabric was a plain weave, with 70 denier 36 filament textured PET yarns in the warp and fill direction. The fabric was comprised of approximately 90 warp yarns and 80 fill yarns per inch of fabric. (hereinafter referred to as a "tent fabric" specifically for this invention). The fabric was roughened with a face-finishing process using a diamond coated roll at a level of 600-30-12. Approximately 17% of the surface areas of were roughened by the face-finishing process.

The treated fabric was tested for water and oil repellency, spray rating, dynamic rolling angle by the methods described previously for as received ("AR") samples. The results are shown in Table 1A. The treated fabric was also tested for spray rating after 1000 cycles, 2000 cycles, 5000 cycles, 10000 cycles, and 20000 cycles of Martindale abrasion. Test results are shown in Table 1C.

COMPARATIVE EXAMPLE 7

Tent Fabric No Particles and No Face-Finishing

Example 6 was repeated, except that the Sipernat 22LS™ component was eliminated from the bath. The fabric was not roughened with a face-finishing process.

The treated fabric was tested for water and oil repellency, spray rating, dynamic rolling angle by the methods described previously for as received ("AR") samples. The results are shown in Table 1A.

EXAMPLE 8

Polyester Boat Cover Fabric Face-Finished One Step Treatment

A 200 gram bath containing the following chemicals was prepared:
1. 2 grams (or 1%) of Sipernat 22LS™, hydrophilic silica particles available from Degussa.
2. 10 grams (or 5%) Repearl F-7000, a fluorinated stain repellent agent available from Mitsubishi Corp.; and
3. 2.4 grams (or 1.2%) Milligard MRX™, a cross-linking agent available from Milliken Chemical.

A 100% polyester boat cover fabric was treated with this chemical composition according to the one step application procedure described previously. The wet pickup of the chemical composition on the fabric was about 66%.

The polyester boat cover fabric was obtained from Milliken & Company of Spartanburg, S.C. The fabric was comprised of textured filament polyester 4/150/36 denier warp yarns and textured filament polyester 4/150/36 denier fill yarns woven together in a plain weave construction with 54 ends/inch and 36 picks/inch (hereinafter referred to as a "boat cover fabric" specifically for this invention). The fabric was roughened with a face-finishing process using a combination of 600 grit and 1200 grit diamond coated rolls at levels of 600-30-12 followed by 1200-30-24. Approximately 25% of the surface areas were roughened by the face-finishing process.

The treated fabric was tested for water and oil repellency, spray rating, dynamic rolling angle by the methods described previously for as received ("AR") samples. The results are shown in Table 1A. The spray rating and dynamic rolling angle were tested after 1 home wash, 5 home washes, 10 home washes, and 20 home washes. The test results are shown in Table 1B. The spray rating also tested after 1000 cycles, 2000 cycles, 5000 cycles, 10000 cycles and 20000 cycles of Martindale abrasion. Test results are shown in Table 1C.

COMPARATIVE EXAMPLE 9

Boat Cover Fabric No Particles and No Face-Finishing

Example 8 was repeated except that the Sipernat 22LS™ component was eliminated from the bath. The fabric was not roughened with a face-finishing process.

The treated fabric was tested for water and oil repellency, spray rating, dynamic rolling angle by the methods described previously for as received ("AR") samples. The results are shown in Table 1A.

EXAMPLE 10

Flat Woven Polyester Fabric (Fabric Q) Face-Finished One Step Treatment

Example 8 was repeated except that the boat cover fabric was replaced by a flat woven polyester fabric. The wet pickup of the chemical composition on the fabric was about 32%.

The flat woven polyester fabric was obtained from Milliken & Company of Spartanburg, S.C. The fabric was a 1×1 plain weave with 34 filament, 4.45 denier per filament polyester yarns in the warp direction and 34 filament, 4.19 denier per filament polyester yarns in the fill direction (hereinafter referred to as "Fabric Q" specifically for this invention). The fabric was roughened with a face-finishing process using a combination of 600 grit and 1200 grit diamond coated rolls at levels of 600-30-6 followed by 1200-30-16. Approximately 18% of the surface areas were roughened by the face-finishing process.

The treated fabric was tested for water and oil repellency, spray rating, dynamic rolling angle by the methods described previously for as received ("AR") samples. The results are shown in Table 1A. The spray rating and dynamic rolling angle were tested after 1 home wash, 5 home washes, 10 home washes, and 20 home washes. The test results are shown in Table 1B. The spray rating also tested after 1000 cycles, 2000 cycles, 5000 cycles, 10000 cycles and 20000 cycles of Martindale abrasion. Test results are shown in Table 1C.

COMPARATIVE EXAMPLE 11

Flat Woven Polyester Fabric (Fabric Q) No Face-Finishing and No Particles

Example 9 was repeated except that the boat cover fabric was replaced by the Fabric Q. The fabric was not roughened with a face-finishing process, and the Sipernat 22LS™ component was eliminated from the bath.

The treated fabric was tested for water and oil repellency, spray rating, dynamic rolling angle by the methods described previously for as received ("AR") samples. The results are shown in Table 1A.

COMPARATIVE EXAMPLE 12

Microdenier Twill Fabric No Face-Finishing Prepared According to U.S. Patent Application No. 2002/0016433 A1 to Keller et al.

A chemical composition according to Example 9 in U.S. Patent Application No. 2002/0016433 A1 to Harald Keller et al. was prepared.

The polyester microdenier twill fabric was treated with this chemical composition according to the spraying application procedure described previously. The fabric was not roughened with a face-finishing process.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

COMPARATIVE EXAMPLE 13

Automotive Twill Fabric No Face-Finishing Prepared According to U.S. Patent Application No. 2002/0016433 A1 to Keller et al.

Example 12 was repeated except that the microdenier twill fabric was replaced by the automotive twill fabric. The fabric was not roughened with a face-finishing process.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

COMPARATIVE EXAMPLE 14

Tent Fabric No Face-Finishing Prepared According to U.S. Patent Application No. 2002/0016433 A1 to Keller et al.

Example 12 was repeated except that the microdenier twill fabric was replaced by the tent fabric. The fabric was not roughened with a face-finishing process.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

COMPARATIVE EXAMPLE 15

Boat Cover Fabric No Face-Finishing Prepared According to U.S. Patent Application No. 2002/0016433 A1 to Keller et al.

Example 12 was repeated except that the microdenier twill fabric was replaced by the boat cover fabric. The fabric was not roughened with a face-finishing process.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

COMPARATIVE EXAMPLE 16

Flat Woven Polyester Fabric (Fabric Q) No Face-Finishing Prepared According to U.S. Patent Application No. 2002/0016433 A1 to Keller et al.

Example 12 was repeated except that the microdenier twill fabric was replaced by Fabric Q. The fabric was not roughened with a face-finishing process.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

EXAMPLE 17

Boat Cover Fabric Face-Finished One Step Treatment

A 200 gram bath containing the following chemicals was prepared:
1. 10 grams (or 5%) Repearl. F-7000, a fluorinated stain repellent agent available from Mitsubishi Corp.
2. 5 grams (or 2.5%) of LUDOX CL-P, colloidal alumina coated silica particles available from Grace Davison.
3. 8 grams (or 4%) Milligard MRX™, a cross-linking agent available from Milliken Chemical.

The polyester boat cover fabric described in Example 8 (roughened with a face-finishing process at levels of 600-30-12 followed by 1200-30-24) was treated with this chemical composition according to the one step application procedure described previously. The wet pickup of the chemical composition on the fabric was about 65%.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

EXAMPLE 18

Boat Cover Fabric No Face-Finishing One Step Treatment

Example 17 was repeated except that the face-finished boat cover fabric was replaced with a boat cover fabric that was not roughened with a face-finishing process.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

EXAMPLE 19

Boat Cover Fabric Face-Finished One Step Treatment

A 200 gram bath containing the following chemicals was prepared:
1. 10 grams (or 5%) Repearl F-7000, a fluorinated stain repellent agent available from Mitsubishi Corp.
2. 2 grams (or 1%) Viviprint 540, poly(vinylpolypyrrolidone) particles available from ISP Technologies.
3. 1.6 grams (or 0.8%) of LUDOX CL-P, colloidal alumina coated silica particles available from Grace Davison.
4. 2.4 grams (or 1.2%) Milligard MRX™, a cross-linking agent available from Milliken Chemical.

The polyester boat cover fabric described in Example 8 (roughened with a face-finishing process at levels of 600-30-12 followed by 1200-30-24) was treated with this chemical composition according to the one step application procedure described previously. The wet pickup of the chemical composition on the fabric was about 68%.

The treated fabric was tested for water and oil repellency, spray rating, dynamic rolling angle by the methods described previously for as received ("AR") samples. The results are shown in Table 1A. The treated fabric was tested for wash and abrasion durability. The test results are shown in Table 1B and Table 1C, respectively.

EXAMPLE 20

Polyester Tent Fabric Face-Finished No Particles One Step Application

The polyester tent fabric described in Example 6 (with a face-finishing process at a level of 600-30-12) was treated in accordance with the one step application procedure described previously, in which a mixture of 1.0% Repearl F-7000 and 2% Milligard MRX™ was applied to the fabric.

The treated fabric was tested for water and oil repellency, spray rating, dynamic rolling angle by the methods described previously for as received ("AR") samples. The results are shown in Table 1A. The treated fabric was also tested for wash and abrasion durability. The test results are shown in Table 1B and Table 1C, respectively.

COMPARATIVE EXAMPLE 21

Tent Fabric No Face-Finishing and No Particles

The polyester tent fabric described in Example 6 (without a face-finishing process) was treated in accordance with the one step application procedure described previously, in which a mixture of 1.0% Repearl F-7000 and 0.25% Milligard MRX™ was applied to the fabric.

The treated fabric was tested for water and oil repellency, spray rating, dynamic rolling angle by the methods described previously for as received ("AR") samples. The results are shown in Table 1A.

EXAMPLE 22

Nylon/Cotton Blend Fabric Face-Finished Two Step Application

A 50% nylon/50% cotton blend fabric was treated in accordance with the two step application procedure described previously. In the first step of the procedure, 2% of Ludox AM colloidal silica particles with an average particle diameter of 12 nm, available from Grace Davison, was applied to the fabric. In the second step of the procedure, a mixture of 5.0% Repearl F-7000 and 1.2% Milligard MRX™ was subsequently applied to the fabric.

The nylon/cotton blend fabric was obtained from Milliken & Company of Spartanburg, S.C. The fabric was comprised of 20/1 ring-spun nylon/cotton (52/48) warp yarns and 17/1 ring-spun nylon/cotton-combed (52/48) filling yarns in a 2×1 left-hand twill construction. (hereinafter referred to as a "nylon/cotton blend fabric" specifically for this invention). The fabric was roughened with a proprietary face-finishing process using 1000 grit sand paper disks. The fabric was subsequently singed to remove long loosened fibers.

The treated fabric was tested for water and oil repellency, spray rating, dynamic rolling angle by the methods described previously for as received ("AR") samples. The results are shown in Table 1A. The treated fabric was tested after 1 home wash and 5 home washes. The test results are shown in Table 1B.

COMPARATIVE EXAMPLE 23

Nylon/Cotton Blend Fabric No Face-Finishing and No Particles

The nylon/cotton blend fabric as described in Example 22 (without a face-finishing process) was treated in accordance with the one step application procedure described previously, in which a mixture of 5.0% Repearl F-7000 and 1.2% Milligard MRX™ was applied to the fabric.

The treated fabric was tested for water and oil repellency, spray rating, dynamic rolling angle by the methods described previously for as received ("AR") samples. The results are shown in Table 1A. The treated fabric was tested after 1 home wash and 5 home washes. The test results are shown in Table 1B.

EXAMPLE 24

Automotive Twill Fabric Face-Finished Two Step Application

The automotive twill fabric (roughened with a face-finishing process at a level of 1200-30-24), as described in Example 4, was treated in accordance with the two step application procedure described previously. In the first step of the procedure, a mixture of 4% Repearl F-7000, 1.2% Milligard MRX, and 0.1% Wetaid NRW (a non-rewetting wetting agent available from Noveon, Inc., Cleveland, Ohio) was applied to the fabric. In the second step of the procedures a mixture of 2.5% Ludox CL-P™, 2.5% Milligard MRX, and 5% Repearl F-7000 was subsequently applied to the fabric while the fabric was still wet. The fabric was then dried and cured.

The treated fabric was tested for water and oil repellency, spray rating, and dynamic rolling angle by the methods described previously for as received ("AR") samples. The results are shown in Table 1A. The treated fabric was also tested for wash and abrasion durability. The test results are shown in Table 1B and Table 1C, respectively.

EXAMPLE 25

Polyester Tent Fabric Face-Finished One Step Application

The face-finished polyester tent fabric (roughened with a face-finishing process at a level of 600-30-12), as described in Example 6, was treated with 5% SE-40A (a polydimethysiloxane based emulsion available from Kelmar Industries of Duncan, S.C.) according to the one step application procedure described previously.

The fabric was pre-washed with water (without detergent) to remove the residual repellent and dried before further testing. The dynamic rolling angle of the fabric was tested and determined to be 25 degrees by the method described previously.

COMPARATIVE EXAMPLE 26

Polyester Tent Fabric No Face-Finishing One Step Application

Example 25 was repeated except that the face-finished polyester tent fabric was replaced with a polyester tent fabric that was not face-finished. The dynamic rolling angle of the fabric was tested and determined to be greater than 50 degrees (which is the limit of the test instrument) by the method described previously.

EXAMPLE 27

Polyester Tent Fabric Face-Finished One Step Application

The face-finished polyester tent fabric (roughened with a face-finishing process at a level of 600-30-12), as described in Example 6, was treated with 5% Consopel ZW (a zirconium wax based emulsion for water repellent available from Consos of Charlotte, N.C.) according to the one step application procedure described previously.

The dynamic rolling angle of the fabric was tested and determined to be 18 degrees by the method described previously.

COMPARATIVE EXAMPLE 28

Polyester Tent Fabric No Face-Finishing One Step Application

Example 27 was repeated except that the face-finished polyester tent fabric was replaced with a polyester tent fabric that was not face-finished. The dynamic rolling angle of the fabric was tested and determined to be 23 degrees by the method described previously.

EXAMPLE 29

Nonwoven Fabric Face-Finished One Step Application

Example 8 was repeated except that the polyester boat cover fabric was replaced by a nonwoven fabric. The wet pickup of the chemical composition on the fabric was about 78%.

The nonwoven fabric was a polyester spunbond fabric with a weight density of 25 g/m² available from BBA Nonwovens, Simpsonville, S.C. The fabric was mechanically roughened with a face-finishing process using a diamond coated roll at a level of 1200-15-6.

The treated nonwoven fabric was tested for water and oil repellency, spray rating, and dynamic rolling angle by the methods described previously for as received ("AR") samples. The results are shown in Table 1A.

COMPARATIVE EXAMPLE 30

Nonwoven Fabric No Particles and No Face-Finishing

Example 29 was repeated, except that the Sipernat 22LS™ component was eliminated from the bath. The nonwoven fabric was not treated with a face-finishing process.

The nonwoven fabric was tested for water and oil repellency, spray rating, and dynamic rolling angle by the methods described previously for as received ("AR") samples. The results are shown in Table 1A.

TABLE 1A

Repellency Test Results

| Sample | Water Repellency | Oil Repellency | Spray Rating | DRA* (degree) |
|---|---|---|---|---|
| Ex. 1 | 5 | 5 | 100 | 3.0 |
| Ex. 2 | 5 | 5 | 100 | 3.5 |
| Comp. Ex. 3 | 5 | 5 | 100 | 7.0 |
| Ex. 4 | 7 | 7 | 100 | 3.5 |
| Comp. Ex. 5 | 7 | 6 | 100 | 7.0 |
| Ex. 6 | 6 | 6 | 100 | 2.0 |
| Comp. Ex. 7 | 6 | 6 | 100 | 7.2 |
| Ex. 8 | 6 | 6 | 100 | 4.0 |

TABLE 1A-continued

Repellency Test Results

| Sample | Water Repellency | Oil Repellency | Spray Rating | DRA* (degree) |
|---|---|---|---|---|
| Comp. Ex. 9 | 6 | 6 | 100 | 10.0 |
| Ex. 10 | 5 | 5 | 100 | 10.0 |
| Comp. Ex. 11 | 3 | 4 | 100 | 27.0 |
| Comp. Ex. 12 | 1 | 0 | 90 | 4.5 |
| Comp. Ex. 13 | 1 | 0 | 70 | 5.0 |
| Comp. Ex. 14 | 1 | 0 | 70 | 4.5 |
| Comp. Ex. 15 | 1 | 0 | 90 | 5.4 |
| Comp. Ex. 16 | 1 | 0 | 70 | 22.5 |
| Ex. 17 | 7 | 6 | 100 | 4.5 |
| Ex. 18 | 7 | 6 | 100 | 7.0 |
| Ex. 19 | 6 | 6 | 100 | 6.5 |
| Ex. 20 | 6 | 6 | 100 | 5.0 |
| Comp. Ex. 21 | 6 | 6 | 100 | 9.5 |
| Ex. 22 | 5 | 5 | 100 | 4.7 |
| Comp. Ex. 23 | 5 | 5 | 100 | 7.0 |
| Ex. 24 | 7 | 6 | 100 | 4.9 |
| Ex. 25 | N/A | N/A | N/A | 25 |
| Ex. 26 | N/A | N/A | N/A | >50 |
| Ex. 27 | N/A | N/A | N/A | 18 |
| Ex. 28 | N/A | N/A | N/A | 23 |
| Ex. 29 | 8 | 6 | 100 | 20.0 |
| Comp. Ex. 30 | 8 | 6 | 100 | 38.0 |

*Dynamic rolling angle for rolling of 3 cm.

TABLE 1B

Wash Durability Test Results

| Sample | Spray Rating (AR) | DRA* (degree) (AR) | Spray Rating (1 Wash) | DRA* (degree) (1 Wash) | Spray Rating (5 Wash) | DRA* (degree) (5 Wash) | Spray Rating (10 Wash) | DRA* (degree) (10 Wash) | Spray Rating (20 Wash) | DRA* (degree) (20 Wash) |
|---|---|---|---|---|---|---|---|---|---|---|
| Ex. 1 | 100 | 3.0 | 90 | 4.5 | 75 | 14 | 70 | 18.5 | 60 | 26.5 |
| Ex. 2 | 100 | 3.5 | 100 | 3.5 | 100 | 7.5 | 100 | 8.0 | 100 | 10.0 |
| Ex. 4 | 100 | 3.5 | 100 | 7.0 | 100 | 13.0 | 100 | 18.0 | 75 | 23.0 |
| Ex. 8 | 100 | 4.0 | 100 | 6.5 | 90 | 15.5 | 85 | 23.0 | 85 | 34.5 |
| Ex. 10 | 100 | 10.0 | 70 | 13.0 | 10 | 28.0 | 10 | 35.0 | N/A | N/A |
| Comp. Ex. 12 | 90 | 4.5 | 0 | Wetting | N/A | N/A | N/A | N/A | N/A | N/A |
| Comp. Ex. 13 | 70 | 5.0 | 0 | Wetting | N/A | N/A | N/A | N/A | N/A | N/A |
| Comp. Ex. 14 | 70 | 4.5 | 0 | Wetting | N/A | N/A | N/A | N/A | N/A | N/A |
| Comp. Ex. 15 | 75 | 5.4 | 0 | Wetting | N/A | N/A | N/A | N/A | N/A | N/A |
| Comp. Ex. 16 | 85 | 22.5 | 0 | Wetting | N/A | N/A | N/A | N/A | N/A | N/A |
| Ex. 17 | 100 | 4.5 | N/A | N/A | 100 | 18.5 | 85 | 20.5 | 80** | 22.5** |
| Ex. 18 | 100 | 7.0 | N/A | N/A | 100 | 19.5 | 90 | 24.0 | 85** | 26.5** |
| Ex. 19 | 100 | 6.5 | 100 | 9.0 | 100 | N/A | N/A | N/A | N/A | N/A |
| Ex. 20 | 100 | 5.0 | N/A | N/A | 100 | 10.5 | 100 | 13.0 | 100** | 15.0** |

TABLE 1B-continued

Wash Durability Test Results

| Sample | Spray Rating (AR) | DRA* (degree) (AR) | Spray Rating (1 Wash) | DRA* (degree) (1 Wash) | Spray Rating (5 Wash) | DRA* (degree) (5 Wash) | Spray Rating (10 Wash) | DRA* (degree) (10 Wash) | Spray Rating (20 Wash) | DRA* (degree) (20 Wash) |
|---|---|---|---|---|---|---|---|---|---|---|
| Ex. 22 | 100 | 4.5 | 100 | 8.0 | 90 | 18.0 | N/A | N/A | N/A | N/A |
| Comp. Ex. 23 | 100 | 7.0 | 90 | 16.0 | 70 | 37.5 | N/A | N/A | N/A | N/A |
| Ex. 24 | 100 | 4.9 | 100 | 8.5 | 100 | 13.0 | 100 | 17.0 | 100 | 20.0 |

*Dynamic Rolling Angle for rolling of 3 cm.
**Data for 15 washes.
"N/A" indicates that test data was not available.

TABLE 1C

Abrasion Durability Test Results

| Sample | Spray Rating (AR) | DRA* (degree) (AR) | Spray Rating (2000 cycles) | DRA* (degree) (2000 cycles) | Spray Rating (5000 cycles) | DRA* (degree) (5000 cycles) | Spray Rating (10000 cycles) | DRA* (degree) (10000 cycles) | Spray Rating (20000 cycles) | DRA* (degree) (20000 cycles) |
|---|---|---|---|---|---|---|---|---|---|---|
| Ex. 1 | 100 | 3.0 | 75 | 11.0 | 75 | 17.0 | 70 | 21.5 | 60 | N/A |
| Ex. 2 | 100 | 3.5 | 100 | 12.0 | 100 | 16.5 | 100 | 20.5 | 90 | N/A |
| Ex. 4 | 100 | 3.5 | 70 | N/A | 70 | N/A | 60 | N/A | 50 | N/A |
| Ex. 6 | 100 | 2.0 | 70 | N/A | 70 | N/A | 70 | N/A | 50 | N/A |
| Ex. 8 | 100 | 4.0 | 75 | N/A | 75 | N/A | 70 | N/A | 70 | N/A |
| Ex. 10 | 100 | 10.0 | 100 | N/A | 95 | N/A | 90 | N/A | 85 | N/A |
| Comp. Ex. 12 | 90 | 4.5 | 50 | N/A | 50 | N/A | N/A | N/A | N/A | N/A |
| Comp. Ex. 13 | 70 | 5.0 | 60 | N/A | 60 | N/A | N/A | N/A | N/A | N/A |
| Comp. Ex. 14 | 70 | 18.0 | 45 | N/A | 45 | N/A | N/A | N/A | N/A | N/A |
| Comp. Ex. 15 | 90 | 5.4 | 70 | N/A | 50 | N/A | N/A | N/A | N/A | N/A |
| Comp. Ex. 16 | 85 | 22.5 | 60 | N/A | 60 | N/A | N/A | N/A | N/A | N/A |
| Ex. 17 | 100 | 4.5 | 100 | 28.0 | 100 | 33.5 | 95 | N/A | N/A | N/A |
| Ex. 18 | 100 | 7.0 | 100 | 30.0 | 100 | 35.5 | 85 | N/A | N/A | N/A |
| Ex. 19 | 100 | 6.5 | 100 | 27.5 | 100 | 35.0 | N/A | N/A | N/A | N/A |
| Ex. 20 | 100 | 4.5 | 100 | 14.0 | 100 | 18.0 | 100 | 16.5 | N/A | N/A |
| Ex. 24 | 100 | 4.9 | 100 | 16.5 | 100 | 20.5 | 90 | 25.0 | 70 | 30.0 |

*Dynamic Rolling Angle for rolling of 3 cm.
"N/A" indicates that test data was not available.

The results in Table 1A show that the fabrics treated according to the present invention all exhibited good water and oil repellency and excellent spray rating. When compared to Comparative Examples 11-16, the fabrics treated according to the present invention performed exceptionally well with regard to water and oil repellency and spray rating. Furthermore, the fabrics treated according to the present invention generally exhibited much lower dynamic rolling angles than any of the Comparative Examples. Additionally, Examples 25–28 illustrate the use of a non-fluorochemical repellent. Examples 25 and 26 use silicone as a repellent, and Examples 27 and 28 use zirconium wax as a repellent. The face-finished fabrics of Examples 25 and 27 (treated with silicone and wax, respectively) exhibit a lower dynamic rolling angle than the control fabrics of Examples 26 and 28 (treated with silicone and wax, respectively) indicating that the face-finishing treatment provides a much more hydrophobic substrate than that treated with a repellent alone. Example 29 illustrates that the inventive process may be used to achieve a hydrophobic nonwoven fabric with a dynamic rolling angle that is much lower than the same nonwoven fabric, as shown in Example 30, without face-finishing and particle treatment.

Thus, the results for these Examples illustrate the benefit of the face-finishing treatment and the optional addition of nanoparticles to the surface of a textile substrate, thereby creating a surface roughness similar to that on the surface of Lotus leaf, to create superior liquid repellent textile substrate. The treatment further imparts a "self-cleaning" feature to the fabric such that, for example, undesirable liquids that contact a textile substrate will easily bead up and roll off the surface of the substrate.

The results in Table 1B show that the fabrics treated according to the present invention generally exhibited good durability to washing when tested for spray rating through 20 washes. When compared to Comparative Examples 11–16, the fabrics treated according to the present invention performed exceptionally well with regard to spray rating. Furthermore, the fabrics treated according to the present invention generally exhibited much lower dynamic rolling angles than any of the Comparative Examples. More specifically, Comparative Examples 12–16 failed to exhibit any hydrophobic characteristics after 1 wash, while most of the other Examples remained at least moderately hydrophobic through 20 washes. Thus, the results for these Examples illustrate the benefit of the face-finishing treatment and the optional addition of nanoparticles to the surface of a textile substrate, thereby creating a surface roughness similar to that on the surface of Lotus leaf, to create a super-hydrophobic, self-cleaning textile substrate that is durable to laundering.

The results in Table 1C show that most of the fabrics treated according to the present invention exhibited good spray rating after the treated fabrics have been exposed to 20000 cycles of abrasion testing. When compared to Comparative Examples 12–16, the fabrics treated according to the present invention performed exceptionally well. More specifically, the Comparative Examples 12–16 only exhibited spray ratings in the range of 45 to 60 through 5000 cycles, while many of the Examples treated according to the present invention exhibited spray ratings in the range of 50 to 90 though 20000 cycles—a four fold improvement. Furthermore, Examples 1 and 2 exhibited fairly low dynamic rolling angles through 10000 cycles of abrasion and Example 24 exhibited a fairly low dynamic rolling angle through 20000 cycles, thus illustrating that the fabric treated according to the present invention is capable of maintaining hydrophobic properties when exposed to abrasion, such as that which may be encountered by a fabric during normal use. Thus, the results for these Examples illustrate the benefits of the face-finishing treatment and optionally, the addition of nanoparticles to the surface of a textile substrate, thereby creating a surface roughness similar to that on the surface of Lotus leaf, to create a super-hydrophobic self-cleaning textile substrate that is durable to abrasion.

Sample Preparation for Measuring Fiber Surface Roughness

Representative fibers or yarns from the fabric samples previously described in the Examples section were carefully placed on specimen supports prior to examination in the microscope. These representative roughened fibers that provide the lotus-effect were found to be substantially in the plane of the fiber-containing substrate. A Roughness Factor (R.F.) was determined by actual physical measurement of fibers, as further explained below. In general, the Roughness Factor may be somewhat higher when higher magnification is used, since the units employed in the analysis procedure are more numerous when higher magnifications are used. Therefore, a given magnification of 500× was chosen to standardize the measurement of textile fiber Roughness Factors. Calculations based on other magnifications are shown only for samples where obtained from literature or to make a specific point.

These representative fibers or yarns were then gold-coated in a Denton Desk II model sputter coater (Denton Vacuum, Inc., Morristown, N.J.) such that a uniform coating of approximately 150–200 Angstroms of gold was deposited prior to examination in a scanning electron microscope (SEM).

Imaging was done using an Amray Model 1845FE scanning electron microscope (KLA-Tencor, Inc. 160 Rio Robles, San Jose, Calif. 95134) operating at 5 kV accelerating voltage.

Fiber samples were examined at various magnifications, although 500× was utilized most frequently due to the optimum level of detail observed at this magnification; images were made using a WIN TV-GO (Happauge Computer Works, Inc., Happauge, N.Y.) video card and saved as .jpg image files at 800×600 pixels resolution on an IBM-compatible personal computer.

Procedure Employed to Determine the Roughness Factor (R.F.)

The Roughness Factor ("R.F.") of representative fibers may be objectively measured as indicated below. Images were captured as described previously. Roughened regions within the treated fibers of the textile substrate (see FIG. 7A) were positioned within the SEM so that a clear image of the side silhouette of a treated fiber may be seen. Surface roughness of the fibers due to indentations, protrusions, scuffing, particles, and the like, as a result of the finishing of the textiles, may be clearly seen. It is pointed out that the fibers are not uniformly roughened. That is, the side of the fiber away from the top surface of the textile substrate may not be roughened at all even though the top surface may be roughened substantially. The fiber. R.F. is measured on the top surface of the fiber on a continuous side of a fiber. It is not measured near or in the region of a broken fiber tip or end.

Generated digital images were 800 pixels long by 600 pixels high. The images were captured at 500× magnification of the individual fibers. The images files were saved as 8 bit RGB files in a JPEG format.

FIG. 7A shows initial images of fiber from the tent fabric described in Example 6, as obtained from the SEM. To focus on the edge and its corresponding roughness, a section of the image can be extracted that only shows the roughened edge of the treated fibers in profile. In the extracted image, fiber orientation is directed along one of the sides of the image. That direction is referred to herein as the image length. The length of the image for analysis is 100 microns or longer. For example, FIG. 7B shows an extracted portion from the initial image of the tent fabric as obtained from the SEM.

For analysis, two software packages were employed: Adobe Photoshop 6.0.1, as offered by Adobe Systems Incorporated of San Jose, Calif., and Image Pro Plus 4.5, as offered by Media Cybernetics, Inc of Silver Spring, Md. The extracted images were converted to an 8-bit grayscale (each pixel takes on a gray value from 0, or black, to 255, or white) image in Image Pro Plus. The extracted file was then transferred to Adobe Photoshop. To separate the pixels of the image that represent the edge of the fiber from the background and increase the resolution for analysis, a three pixel diameter eraser tool was used to trace the boundary between the fiber edge and the background. The eraser tool was set to convert all pixels that it crossed over while activated to black, a pixel value of 0. Using a mouse with the magnified image (200% or greater on the screen in Adobe Photoshop), the boundary between the fiber edge and the background was traced accurately by hand to set the background pixels to 0. After the pixels at the edge of the background were set to zero, the rest of the background was also set to 0 (black).

FIG. 7C shows the same image as from FIG. 7B, with the background set to black by the procedure described above. This image is saved as a TIFF file for later analysis in Image Pro Plus.

Using Image Pro Plus, the dark background image files were opened. This image was used to calculate the roughness of the fiber edge. In principal, the roughness parameter was defined to be the length of the actual fiber edge including all protrusions from the surface (the "profile") divided by the length of the image (assuming that the fiber in question extends the whole length of the image).

To determine the profile, the background pixels may be tagged to create a black and white image of the background which shows the shape (i.e. shadow) of the surface roughness of the fiber. To determine the profile, Image Pro Plus allows the user to select portions of an image based on the portion's pixel value and size. Because the background pixels have been set to black (a pixel value of zero), the background can be selected from the image by segmenting out the pixels that have a value near 0.

Because there can be shadows in an image, there are some pixel objects that have numerical pixel values near zero but do not represent the background and thus, the profile. These objects invariably include fewer pixels than the background. Therefore, the analyst can exclude shadows from the profile by requiring that the pixel objects that are tagged as the background have a pixel size larger than the sizes of the shadows in the image (this will vary depending on the image).

For completeness, objects are selected so that pixel "holes" in a big background of selected pixels are automatically selected. Pixels neighboring each other in a four-connected sense are tagged as part of the background. This means that objects in an image should be connected to the main body of the image by having a "neighbor" directly above and/or below or on either side of the specified pixel. Pixels that are connected through a diagonal only will not be included in the selected background object. An example of the tagged background image for FIG. 7C is shown in FIG. 7D. With this image in hand, the task is to measure the length of the background interface with the fiber, or the length of the profile.

To measure the length of a profile, the black and white shadow images are used. The procedure used estimates the length of the interface by defining a one pixel wide line that traces the edge of the background/fiber boundary. To generate this one pixel wide line, the following procedure is used.

The shadow image is duplicated first. The first copy of the shadow image is treated with a morphological filter called an erosion filter. The erosion filter takes a black and white image and causes the boundary of the white portion of the image to move so that the white portion of the image has decreased (fewer pixels) and the dark portion has increased (more pixels) but the boundary line shape is intact.

The shape of the erosion filter is a 3×3 cross. This filter is applied one time to the image. The second copy of the original shadow image is then treated with a dilation filter. This is the opposite of the erosion filter. For a dilated image, the white portion of the image grows and the dark portion decreases, thereby preserving the shape of the boundary. The dilation filter again uses a 3×3 cross-shaped filter with one pass. Using image arithmetic, the absolute difference of the eroded and dilated image gives an image where only a line (wider than one pixel) at the original background/fiber interface remains. This results because the erosion and dilation filters have left all portions of the image the same except in the interface region. To obtain the one-pixel wide line, the absolute difference image is treated with one pass of a so-called "pruning" filter. This procedure takes multi-pixel wide lines and shrinks them to one pixel. Any branches off of the boundary line are removed. This final image called the profile image gives us a one-pixel wide white (pixel value 255) line that represents the roughness profile of the treated fiber. An example of the profile image for FIG. 7B is shown in FIG. 7E.

The Roughness Factor ("R.F.") corresponds to the length of the roughened edge, and is, in general, directly proportional to the degree of surface roughness exhibited by a textile fiber. It is calculated as defined herein. The counting tools of Image Pro Plus are used on the profile image. The counting tool is set up to count all white (pixel value 255) objects of size one pixel or larger. Multiple pixels are counted as a single object only if they are four-connected as described above.

The counting tool gives at least two pieces of information. The counting tool provides the number of pixels in the boundary and the number of objects in the boundary. The significance of the objects relates back to whether the pixels are four-connected or not. This is important for calculating the length of the border because a connection along a diagonal (called an eight-connection) has a length by geometry of $2^{1/2}$ pixels while a 4-connection has a length of only 1 pixel. If there are N objects and M pixels in the boundary, there are N−1 diagonal connections (length $2^{1/2}$) and M−N straight connections (length 1). Therefore, the length of the profile ($L_P$) is (in pixel units):

$$L_P = (N-1)2^{1/2} + (M-N).$$

The image length ($L_I$) is simply the pixel length of the image, which is equivalent to the length being sampled along the fiber. This can be found in Image Pro Plus, for instance, by looking at the bitmap and counting the column length of the image. The roughness factor (R.F.) parameter for the fiber in question can now be obtained by calculating the ratio R.F. as:

$$R.F. = L_P/L_I.$$

Data generated for the selected examples are reported in Tables 1D and 1E below. The Example number, which corresponds to the data generated in Tables 1A–1C, is also utilized in Tables 1D and 1E. For instance, "Ex. 2" refers to a textile substrate prepared as indicated previously in Example 2. Also, for comparison, a fiber extracted from the substrate in a region having a highly roughened surface as a result of the face-finishing treatment and having particles present on its surface (notated as "FF+particles" in the Tables) was compared with a fiber extracted from the substrate in a region having little to no surface roughness from the face-finishing treatment but having particles on its surface (notated as "particles" in the Tables).

TABLE 1D

Roughness Factor (R.F.) Data from Examples

| Sample | Treatment | Magnification | Number of Pixels (N) | Number of Objects (N) | Length of Profile ($L_P$) | Length of Image ($L_I$) | R.F. |
|---|---|---|---|---|---|---|---|
| Lotus leaf | Natural | 2000 | 653 | 325 | 480 | 786.21 | 1.64 |
| Automotive | FF+ | 500 | 584 | 231 | 474 | 678.27 | 1.43 |

TABLE 1D-continued

Roughness Factor (R.F.) Data from Examples

| Sample | Treatment | Magnification | Number of Pixels (N) | Number of Objects (N) | Length of Profile ($L_P$) | Length of Image ($L_I$) | R.F. |
|---|---|---|---|---|---|---|---|
| Twill Fabric Ex. 4 | particles | | | | | | |
| Boat Cover Fabric Ex. 8 | FF+ particles | 500 | 858 | 304 | 771 | 982.51 | 1.27 |
| Boat Cover Fabric Ex. 8 | FF+ particles | 500 | 798 | 209 | 771 | 883.16 | 1.15 |
| Boat Cover Fabric Ex. 8 | particles | 500 | 771 | 75 | 771 | 800.65 | 1.04 |
| Boat Cover Fabric Ex. 8 | particles | 500 | 772 | 85 | 771 | 805.79 | 1.05 |
| Microdenier Twill Fabric Ex. 1 | FF+ particles | 500 | 365 | 121 | 300 | 413.71 | 1.38 |
| Microdenier Twill Fabric Ex. 1 | particles | 500 | 300 | 32 | 300 | 311.84 | 1.04 |
| Microdenier Twill Fabric Ex. 1 | particles | 500 | 300 | 44 | 300 | 316.81 | 1.06 |
| Fabric Q Ex. 10 | FF+ particles | 500 | 967 | 331 | 699 | 1102.69 | 1.58 |
| Fabric Q Ex. 10 | particles | 500 | 699 | 74 | 699 | 728.24 | 1.04 |
| Tent Fabric Ex. 6 | FF+ particles | 500 | 680 | 248 | 594 | 781.31 | 1.32 |
| Tent Fabric Ex. 6 | particles | 500 | 594 | 38 | 594 | 608.33 | 1.02 |
| Tent Fabric Ex. 6 | FF+ particles | 1000 | 919 | 335 | 717 | 1056.35 | 1.47 |
| Tent Fabric Ex. 6 | particles | 1000 | 717 | 56 | 717 | 738.78 | 1.03 |
| Tent Fabric Ex.20 | FF | 1000 | 894 | 424 | 717 | 1068.21 | 1.49 |

TABLE 1E

Roughness Factor (R.F.) Data from Comparative Examples

| Sample | Treatment | Magnification | Number of Pixels (N) | Number of Objects (M) | Length of Profile ($L_P$) | Length of Image ($L_I$) | R.F. |
|---|---|---|---|---|---|---|---|
| Automotive Twill Fabric Comp. Ex. 13 | Treated as in U.S. Pat. App. No. 2002/0016433 A1 | 500 | 789 | 150 | 785 | 849.72 | 1.08 |
| Automotive Twill Fabric Comp. Ex. 13 | Treated as in U.S. Pat. App. No. 2002/0016433 A1 | 500 | 828 | 214 | 785 | 915.23 | 1.17* |
| Automotive Twill Fabric Comp. Ex. 13 | Treated as in U.S. Pat. App. No. 2002/0016433 A1 | 500 | 790 | 129 | 785 | 842.02 | 1.07 |
| Automotive Twill Fabric Comp. Ex. 13 | Treated as in U.S. Pat. App. No. 2002/0016433 A1 | 500 | 806 | 143 | 785 | 863.82 | 1.10 |
| Automotive Twill Fabric Comp. Ex. 13 | Treated as in U.S. Pat. App. No. 2002/0016433 A1 | 500 | 860 | 240 | 785 | 958.00 | 1.22* |
| Boat Cover Fabric Comp. Ex. 15 | Treated as in U.S. Pat. App. No. 2002/0016433 A1 | 500 | 786 | 142 | 785 | 843.40 | 1.07 |
| Boat Cover Fabric | Treated as in U.S. Pat. App. No. | 500 | 824 | 254 | 785 | 927.80 | 1.18* |

TABLE 1E-continued

Roughness Factor (R.F.) Data from Comparative Examples

| Sample | Treatment | Magnification | Number of Pixels (N) | Number of Objects (M) | Length of Profile ($L_P$) | Length of Image ($L_I$) | R.F. |
|---|---|---|---|---|---|---|---|
| Comp. Ex. 15 Boat Cover Fabric | 2002/0016433 A1 Treated as in U.S. Pat. App. No. | 500 | 785 | 156 | 785 | 848.20 | 1.08 |
| Comp. Ex. 15 Boat Cover Fabric | 2002/0016433 A1 Treated as in U.S. Pat. App. No. | 500 | 794 | 186 | 785 | 869.63 | 1.11 |
| Comp. Ex. 15 Microdenier Twill Fabric | 2002/0016433 A1 Treated as in U.S. Pat. App. No. | 500 | 785 | 110 | 785 | 829.15 | 1.06 |
| Comp. Ex. 12 Microdenier Twill Fabric | 2002/0016433 A1 Treated as in U.S. Pat. App. No. | 500 | 795 | 117 | 785 | 842.05 | 1.07 |
| Comp. Ex. 12 Microdenier Twill Fabric | 2002/0016433 A1 Treated as in U.S. Pat. App. No. | 500 | 620 | 64 | 620 | 645.10 | 1.04 |
| Comp. Ex. 12 Microdenier Twill Fabric | 2002/0016433 A1 Treated as in U.S. Pat. App. No. | 500 | 620 | 69 | 620 | 647.17 | 1.04 |
| Comp. Ex. 12 Tent Fabric Comp. Ex. 14 | 2002/0016433 A1 Treated as in U.S. Pat. App. No. 2002/0016433 A1 | 500 | 619 | 96 | 618 | 657.35 | 1.06 |
| Tent Fabric Comp. Ex. 14 | Treated as in U.S. Pat. App. No. 2002/0016433 A1 | 500 | 618 | 118 | 618 | 665.46 | 1.08 |

*These unusually high Roughness Factors are believed to be caused by one or a few large isolated agglomerates of particles on the fiber surface.

The results shown in Tables 1D and 1E illustrate that the fabrics treated according to the present invention have a surface composed of fibers that exhibited a higher Roughness Factor than other super-hydrophobic textile fiber surfaces in the prior art, such as those described herein for the Comparative Examples. The Roughness Factor data also shows that attempting to use particles alone to create a roughened surface results in fibers on the treated surface of the fabric having a low Roughness Factor (typically RF<1.10). However, in some unusual cases, high Roughness Factor values may be generated by large isolated particle agglomerations, which are not durably bound to the substrate. The last three Examples shown in Table 1D are provided to illustrate that even at higher magnification (1000×), particles added to the fiber surface do not contribute significantly to the Roughness Factor as described in the present invention. Thus, the combination of face-finishing the textile surface and treating it with particles, as described by the present invention, creates a surface with features imposed on the fibers with length scales most like those on the surface of the Lotus leaf, wherein the surface exhibits a Roughness Factor of greater than or equal to 1.10, and wherein the treated substrate exhibits superior liquid repellent properties.

The results shown in Tables 1A–1E indicate that surface roughness indeed affects the liquid repellent properties imparted to a textile substrate, as evidenced by low dynamic rolling angles, high spray ratings, and high repellency to water and oil. As illustrated and described herein, a surface of the present invention exhibits greater and more durable liquid repellency and self-cleaning characteristics than others in the prior art. In comparing the data in the Tables, the present invention clearly illustrates that those fabrics having the best repellency, spray rating, and wash durability also exhibit the highest Roughness Factor.

Accordingly, this invention is capable of filling the need for creating textile substrates that have superior liquid repellent and self-cleaning properties which may be useful in many end-use applications where such attributes are desirable. Some of these end-uses include, without limitation, outerwear (such as raingear), outdoor fabric (such as tents, awnings, and boat covers), automotive fabrics (such as for automotive convertible tops), and apparel.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A method of making a fiber-containing substrate comprising the steps of:
   (a) providing a fiber-containing substrate, said substrate having a first surface and a second surface; and
   (b) face-finishing at least said first surface of said substrate by exposing said first surface to one or more abrasive surfaces coated with diamond grit having an average grit size of between about 600 and about 1200, thereby forming integral microscopic surface structures upon said first surface, wherein (i) said integral microscopic surface structures have projections substantially normal to the plane of said fiber-containing substrate, and
(ii) said at least first surface is comprised of portions having a plurality of substantially unbroken fibers comprising surface structures along at least part of the length of said fibers, and wherein said fibers have a Roughness Factor greater than or equal to about 1.10.

2. The method of claim 1 wherein said abrasive surfaces are comprised of one or more abrasive cylindrical rolls.

* * * * *